United States Patent
Smith

(10) Patent No.: US 10,919,618 B2
(45) Date of Patent: Feb. 16, 2021

(54) FLUID FLOW CONTROL FOR AN AEROFOIL

(71) Applicant: Fourth Dimensional Aerospace Technology Limited, Tortola (VG)

(72) Inventor: John Jaycott Smith, Caernarfon (GB)

(73) Assignee: Fourth Dimensional Aerospace Technology Limited, Tortola (VG)

( * ) Notice: Subject to any disclaimer, the term of this patent is extended or adjusted under 35 U.S.C. 154(b) by 371 days.

(21) Appl. No.: 15/743,720

(22) PCT Filed: Jul. 18, 2016

(86) PCT No.: PCT/GB2016/052167
§ 371 (c)(1),
(2) Date: Jan. 11, 2018

(87) PCT Pub. No.: WO2017/009670
PCT Pub. Date: Jan. 19, 2017

(65) Prior Publication Data
US 2018/0201364 A1    Jul. 19, 2018

(30) Foreign Application Priority Data
Jul. 16, 2015 (GB) .................................. 1512480.3

(51) Int. Cl.
*B64C 23/06* (2006.01)

(52) U.S. Cl.
CPC ............ *B64C 23/069* (2017.05); *Y02T 50/10* (2013.01)

(58) Field of Classification Search
CPC . B64C 23/069; B64C 23/065; B64C 2230/20; B64C 23/00; B64C 21/02; B64C 3/14; B64C 9/14
(Continued)

(56) References Cited

U.S. PATENT DOCUMENTS 2,075,817 A * 4/1937 Loerke .................. B64C 23/065
244/130
3,144,220 A * 8/1964 Kittelson ................ B64C 23/00
244/203
(Continued)

FOREIGN PATENT DOCUMENTS

CN    201023655    2/2008
CN    102741121    10/2012
(Continued)

OTHER PUBLICATIONS

GB Search Report for GB Patent Application 1612416.6 dated Jan. 19, 2017.
(Continued)

*Primary Examiner* — Claude J Brown
(74) *Attorney, Agent, or Firm* — Kilpatrick Townsend & Stockton LLP

(57) ABSTRACT

A device for influencing the wake flow of an aircraft wing having a high pressure side and a lower pressure side, the device including a body adapted for attachment in the region of the tip of the aircraft wing and having a through-duct with a first opening at a first end of the duct being located on the high pressure side of the wing and a second opening at a second end of the duct being located on the low pressure side of the wing, the duct being configured to permit a fluid flow through the duct so as to inhibit the flow of the fluid around the outboard extremity of the wing and to direct the fluid flow through the duct into a pair of opposing rotating flows of substantially equal magnitude externally of the duct.

20 Claims, 15 Drawing Sheets

SECTION A-A
SCALE 1 : 12

(58) Field of Classification Search
USPC .................................................. 244/199.4
See application file for complete search history.

(56) References Cited

U.S. PATENT DOCUMENTS

| | | | |
|---|---|---|---|
| 4,382,569 A | 5/1983 | Boppe et al. | |
| 4,478,380 A * | 10/1984 | Frakes | B64C 23/069 244/199.3 |
| 5,348,253 A * | 9/1994 | Gratzer | B64C 23/069 244/91 |
| 5,791,875 A * | 8/1998 | Ngo | B64C 23/06 416/90 A |
| 5,806,807 A | 9/1998 | Haney | |
| 6,368,059 B1 | 4/2002 | Maines | |
| 6,474,604 B1 * | 11/2002 | Carlow | B64C 39/062 244/198 |
| 7,207,526 B2 * | 4/2007 | McCarthy | B64C 23/072 244/199.4 |
| 8,490,926 B2 | 7/2013 | Clingman et al. | |
| 9,278,753 B2 | 3/2016 | Reckzeh et al. | |
| 2005/0184196 A1 * | 8/2005 | Shmilovich | B64C 23/065 244/199.3 |
| 2009/0256029 A1 * | 10/2009 | Malachowski | B64C 23/069 244/199.4 |
| 2010/0303634 A1 * | 12/2010 | Long | F01D 5/146 416/90 A |
| 2011/0260008 A1 * | 10/2011 | Smith | F01D 5/145 244/199.4 |
| 2011/0309202 A1 * | 12/2011 | Smith | B64C 23/065 244/208 |
| 2017/0073062 A1 * | 3/2017 | Firth | B64C 23/069 |

FOREIGN PATENT DOCUMENTS

| | | |
|---|---|---|
| CN | 103419929 | 12/2013 |
| DE | 3836673 | 5/1990 |
| EP | 2404517 A2 | 6/2013 |
| GB | 732617 A | 6/1955 |
| WO | WO 2009/098442 A2 | 8/2009 |

OTHER PUBLICATIONS

EP Search Report and Written Opinion for PCT/US2016/052167 dated Dec. 16, 2016.
Chinese Application No. CN201680041978.X, Office Action, dated Nov. 3, 2020, 6 pages.

* cited by examiner

SECTION A-A
SCALE 1 : 12

DETAIL I
SCALE 1 : 6

FLUID FLOW CONTROL FOR AN AEROFOIL

This invention relates to a device for influencing the fluid flow over an aerofoil, and in particular to influencing the wake flow of an aerofoil.

BACKGROUND

FIG. 1 shows the wings 100 of an aircraft in plan view. The wings are shown with a wingspan b, a wing area S, a root chord length $C_r$ and a tip chord length $C_t$ and are disposed either side of a fuselage (indicated here by the centreline 112). An oncoming fluid with a free stream velocity $V_\infty$ (relative to the wings) is shown at 102. The wings have an upper surface 104 and a lower surface 106.

When the wing is subject to fluid flow (e.g. when the aircraft is in flight), the fluid flow over the upper and lower surfaces of the wing, when the wing is at an appropriate angle of attack to the flow, produces a relatively low pressure region over the upper surface and a relatively high pressure region over the lower surface to thereby generate lift. The upper surface may therefore be referred to as a lower, or low, pressure surface and the lower surface a higher, or high, pressure surface.

As a result of the pressure imbalance between the upper and lower surfaces, on a standard aircraft wing the freestream airflow under the wing (in the high pressure region) migrates around the outboard extremity of the wing (the wingtip) to the low pressure side on the top surface of the wing. Thus, there is a spanwise flow in the outboard direction toward the wingtip on the lower surface of the wing. This is shown in FIG. 1 by the arrows 110. Conversely, the airflow migration from high pressure to low pressure results in the airflow over the upper surface of the wing having a spanwise component in the inboard direction toward the fuselage (indicated at 108). Thus the streamlines over the lower surface diverge from the fuselage in the outboard direction whilst the streamlines over the upper surface converge to the fuselage in the inboard direction. When these converging and diverging streamlines meet at the trailing edge of the wing, vortices are produced. The resultant vortex field extends across the trailing edge of the wing out to the wingtips. The vortices along the trailing edge may be referred to as bound vortices; that is according to Kutta Joukowsky theorem they circulate the wing as a boundary layer leaving vortices to shed from the trailing-edge of the wing. The wingtip vortices are known as trailing vortices and extend downstream from the wingtips. Collectively, the vortices shed from both wings produce a trailing vortex sheet, bound by vortices attached and trailing from the wingtips. The vortices of the vortex sheet have less energy (i.e. their cores are at relatively lower pressure) than those at the wingtips and as a consequence are drawn towards or into the wingtip vortex core thus strengthening the wake turbulence generated. The vortices shed from the wing are illustrated in FIG. 2, which shows the wing in front view. The vortices shed from the wingtips are denoted at 202 and the lower energy vortex sheet denoted at 204.

The effect of vortices shed from the wing trailing edge and wingtip vortices is to induce a downward component of velocity at and behind the wing. This downward component is called downwash. The magnitude of the downwash at any section along the span is equal to the sum of the effects of all the trailing vortices along the entire span. The effect of the downwash is to change the relative direction of the airstream over the section of the wing, which reduces the angle of attack of the wing. The downwash in effect rotates the relative direction of the incoming flow. This rotation of the airflow over the wing causes a corresponding rotation of the lift vector (which is typically perpendicular to the relative direction of the incoming flow) to produce a drag component in the direction of motion. This component is called the "Induced Drag", and may be denoted $D_i$.

There have been various proposals for combating Induced Drag. In high performance sailplanes and in long-range airliners, high aspect ratio (AR) wings are used, as Di is inversely proportional to aspect ratio; unfortunately, the design of high aspect wings with sufficient structural strength is difficult. It also reduces the maneuverability of the associated aircraft, as well as increasing airframe weight, manufacturing cost and profile/parasite drag. More than that any aerodynamic gains in performance/fuel saving are very small.

Also developed in aircraft is the use of blended winglets—airfoil section members extending upwardly from the tips of the wings. The purpose of these winglets is to control the flow of air from the high-pressure (lower wing) surface to the lower pressure (upper wing) surface and so reduce the strength of wingtip vortices, and thus the Induced Drag. While blended winglets may provide some reduction in the induced drag created by the wingtip vortices, it does not eliminate the trailing vortex wake created by the converging/diverging airflows at the wing trailing edge. Further, since such winglets are subject to dynamic and lateral flow forces, the winglet produces tension and/or torsion stresses in the associated wing spar section(s) of the wing. Wings employing winglets therefore often require strengthening to avoid mechanical failure. They may also have additional weight penalties.

SUMMARY

According to a first aspect of the present disclosure there is provided device for influencing the wake flow of an aircraft wing, the device comprising a body having an inboard surface having a mating region configured to conform to the shape of a portion of the tip of the aircraft wing and the body defining a duct extending therethrough such that, when the body is attached to the wing with the mating surface region flush against said portion of the tip of the wing, a first opening at a first end of the duct is located on the high pressure aspect of the wing, a second opening of the duct is located on the low pressure aspect of the wing and the centroid of the second opening is located aft and outboard of the centroid of the first opening.

According to a second aspect of the present disclosure there is provided an aerofoil comprising a structure for influencing the wake flow of the aerofoil when the aerofoil is subject to fluid flow, the aerofoil having a root end and a tip end, a high pressure side and a low pressure side and a leading edge and a trailing edge, the structure comprising a body located in the vicinity of the tip of the aerofoil, the body defining a duct extending therethrough, a first opening at a first end of the duct located on the high pressure side of the aerofoil, a second opening at a second end of the duct located on the low pressure side of the aerofoil and the centroid of the second opening being aft and outboard of the centroid of the first opening.

According to third aspect of the present disclosure there is provided a device for influencing the wake flow of an aircraft wing having an inboard root end and an outboard tip end, a high pressure side and a low pressure side and a leading edge and a trailing edge, the device comprising a body adapted for attachment in the region of the tip of the aircraft wing and having a through-duct with a first opening at a first end of the duct being located on the high pressure side of the wing and a second opening at a second end of the duct being located on the low pressure side of the wing, the duct being configured to, when the wing is exposed to fluid flow, permit an fluid flow through the duct so as to inhibit the flow of fluid around the outboard extremity of the wing and to direct the fluid flow through the duct into a pair of opposing rotating flows of substantially equal magnitude externally of the duct.

According to a fourth aspect of the present disclosure there is provided an aerofoil comprising a structure for influencing the wake flow of the aerofoil when the aerofoil is subject to fluid flow, the aerofoil having an inboard root end and an outboard tip end, a high pressure side and a low pressure side and a leading edge and a trailing edge, the structure comprising a body located in the vicinity of the tip of the aerofoil, the body having a through-duct with a first opening at a first end of the duct being located on the high pressure side of the aerofoil and a second opening of the duct being located on the low pressure side of the aerofoil, the duct being configured to, when the aerofoil is exposed to fluid flow, permit a fluid flow through the duct to inhibit the flow of fluid around the outboard extremity of the aerofoil and to direct the fluid flow through the duct into a pair of opposing rotating flows of substantially equal magnitude externally of the duct.

The first opening of the duct may be formed in part from: (i) an intake surface contoured to entrain oncoming fluid into the duct along an inboard region at relative low pressure and to induce within a part of the fluid flow through the duct along the inboard region a first rotational component; and (ii) outboard edge comprising a formation configured to reduce an inlet velocity of fluid in an outboard region of the duct to thereby generate a region of relative high pressure whose boundary is convex that induces within a part of the fluid flow through the duct a second rotational component opposite in direction to the first rotational component; the duct being configured to direct the parts of the fluid flow with the first and second rotational components out of the second opening into the pair of opposing rotating flows.

The duct may have a plenum located between the first and second openings, and a first restriction located between the plenum and the first opening.

The duct may further have a second restriction located between the plenum and the second opening.

An outboard wall of the duct may define a fluid-arresting structure configured to, when the device or aerofoil is exposed to fluid flow, generate a region of relative high pressure within the duct that contributes to directing the airflow through the duct into a pair of opposing rotating flows of substantially equal magnitude externally of the duct.

The fluid-arresting structure may be in the shape of an aerofoil nose section. It may define an outboard edge of the first opening. The fluid-arresting structure may be a convex portion of the outboard wall of the duct. The fluid-arresting structure may at least in part define the first restriction.

The fluid-arresting structure may be configured to, when the device or aerofoil is exposed to fluid flow, reduce the velocity of fluid entering the duct within an outboard region of the duct to thereby generate the relative high pressure region.

The fluid-arresting structure may comprise a trip strip in the vicinity of the first opening.

The region of relative high pressure may cause the airflow through the duct to have a pressure and velocity imbalance between inboard and outboard sides of the duct within the first restriction and the plenum.

The duct may be configured to have a cross-sectional area profile that causes the region of relative high pressure to adopt an aerofoil shape oriented generally along the longitudinal direction of the duct.

The duct may be configured so that, when the device or aerofoil is exposed to a fluid flow, the region of relative low pressure along the inboard region of the duct and the increase in duct surface area from the first restriction to the plenum causes the region of relative high pressure to adopt the aerofoil shape.

The region of relative high pressure may cause part of the airflow through the duct to adopt a first rotational component.

The region of relative high pressure of aerofoil shape causes part of the airflow through the duct to adopt streamlines that follow said aerofoil shape thereby causing said part of the airflow to adopt the first rotational component.

The duct may be configured to generate a region of relative low pressure along its inboard wall adjacent to the region of relative high pressure The body may comprise an intake surface that extends into an inboard wall of the duct, the intake surface being configured to, when the device or aerofoil is exposed to fluid flow, entrain fluid into the duct via the first opening, the intake surface extending generally in an upwards and outboard direction to encourage a part of the fluid flow through the duct to remain attached to the inboard wall.

The intake surface may be contoured so as to cause a part of the fluid flow through the duct along its inboard region to adopt a second rotational component opposite in direction to the first rotational component.

The second restriction may be configured to cause the part of the airflow with the first rotational component to adopt a substantially equal mass flow rate as the part of the airflow with the second rotational component and to direct said parts of the airflow out of the duct via the second opening into the pair of opposing rotating flows.

The second restriction may be configured to equalise fluid pressure and velocity imbalances between the inboard and outboard regions of the duct.

The region of relative high pressure may have a fluid velocity less than approximately 60 $ms^{-1}$ when the device or aerofoil is exposed to fluid flow with a velocity between 190 $ms^{-1}$ and 210 $ms^{-1}$.

The intake surface leading into the duct opening may be swept relative to a chord line of the body. It may be swept by approximately 5 degrees.

The body may have a first outer surface that encompasses the first opening and a second outer surface that encompasses the second opening, the first and second outer surfaces being cambered so as to, when exposed to fluid flow, generate a first localised region of low pressure outboard of the first opening on the high pressure side, and a second region of low pressure inboard of the second opening on the low pressure side, whereby the first and second low pressure regions pressure balance the pair of opposing rotating flows.

The second region of low pressure may be in the vicinity of the tip and operate to re-orientate streamlines thereover to thereby inhibit the creation of vortices from the trailing edge.

The body may have a leading edge and at least one chord line, the leading edge defining a sweep angle relative to the at least one chord line. The sweep angle between the chord line and leading edge may be approximately 24 degrees.

The centroid of the second opening may be positioned outboard and aft relative to the centroid of the first opening.

The first opening may be a fluid inlet and the second opening a fluid outlet.

According to a fifth aspect of the present disclosure there is provided an aircraft wing having a formation at its tip defining a duct extending through the wing from its underside to its upper side, the duct having an inlet on the underside of the wing and an outlet on the upper side of the wing, a plenum between the inlet and the outlet and a restriction between the inlet and the plenum, the duct being configured so that, when the wing is exposed to a free-stream flow, a flow is developed through the duct, the restriction contributes to the formation of a relatively high pressure region on the outboard side of the duct in the region of the plenum and the majority of the flow leaving the duct by the outlet is constituted as two counter-rotating vortices.

The inboard surface of the duct may be concave in the region of the restriction and the outboard wall of the duct is convex in the region of the restriction.

The inboard edge of the inlet may be smoothly curved and extend generally in an upwards and outboard direction, thereby encouraging the attachment of a boundary layer to the inboard wall of the duct.

The outboard edge of the inlet may comprise an abrupt formation for encouraging a turbulent flow at the outboard region of the entrance to the duct.

The abrupt formation may be a trip strip extending along the outboard edge of the inlet.

The duct may be configured such that when the wing is subject to a free-stream flow at a cruising speed of the aircraft the two counter-rotating vortices are of substantially equal energy.

The duct may be configured such that when the wing is subject to a free-stream flow at a cruising speed of the aircraft the two counter-rotating vortices are directed in such a way as to meet and substantially cancel the angular momentum of their respective flows downstream of the wing.

According to a sixth aspect of the present disclosure there is provided a method for controlling the wake turbulence of an aircraft wing, the method comprising providing the wing with a formation at its tip defining a duct extending through the wing from its underside to its upper side, the duct having an inlet on the underside of the wing and an outlet on the upper side of the wing, a plenum between the inlet and the outlet and a restriction between the inlet and the plenum, the duct being configured so that, when the wing is exposed to a free-stream flow, a flow is developed through the duct, the restriction contributes to the formation of a relatively high pressure region on the outboard side of the duct in the region of the plenum and the majority of the flow leaving the duct by the outlet is constituted as two counter-rotating vortices.

According to a seventh aspect of the present disclosure there is provided a method for controlling the wake turbulence of an aircraft wing having with a formation at its tip defining a duct extending through the wing from its underside to its upper side, the duct having an inlet on the underside of the wing and an outlet on the upper side of the wing, a plenum between the inlet and the outlet and a restriction between the inlet and the plenum, the duct being configured so that, when the wing is exposed to a free-stream flow, a flow is developed through the duct, the restriction contributes to the formation of a relatively high pressure region on the outboard side of the duct in the region of the plenum and the majority of the flow leaving the duct by the outlet is constituted as two counter-rotating vortices, the method comprising subjecting the wing to a free-stream flow so as to cause the said vortices to be generated.

BRIEF DESCRIPTION OF FIGURES

The present invention will now be described by way of example with reference to the accompanying drawings. In the drawings.

Where appropriate, like reference numerals have been used to denote like components.

DETAILED DESCRIPTION

Described herein is a device for influencing the wake flow of an aerofoil. The device may form part of the aerofoil (e.g. be integral with the aerofoil) or it may be a standalone component capable of being fitted to existing aerofoils in the region of the aerofoil's tip, i.e. so as to occupy an outboard position of the aerofoil. The device comprises a passive fluid-blowing system that inhibits the formation of wingtip vortices and thus reduces induced drag on the aerofoil. The fluid-blowing system comprises a body with a duct extending through the body from a first opening positioned on the normally high pressure side of the aerofoil (for an aircraft wing this is the lower surface of the aerofoil) to a second opening positioned on the normally low pressure side of the aerofoil (for an aircraft wing this is the upper surface of the aerofoil). In normal operation, when the aerofoil is subject to an oncoming fluid flow fluid flows into the duct through the opening on the high pressure side (the inlet) and exits the duct through the opening on the low pressure side (the outlet). The duct is configured in such a way that the exiting fluid leaves the duct in the form of two rotating flows. The flows extend substantially in the direction of the free stream flow to which the aerofoil is subject. The flows rotate in opposite directions to each other. The flows are of substantially equal magnitude, or more particularly vorticity magnitude. The duct is configured such that these contra-rotating flows are directed so as to interact with each other downstream of the duct. The duct is configured that due in part to the substantially equal magnitude and opposite rotation direction of the flows, the interaction of the flows causes their vorticity to at least substantially cancel in the near downstream of the aerofoil. In comparison with normal aerofoils, this cancellation can have the effect of reducing induced drag. The body of the device may be shaped to induce the entrainment of fluid in the high pressure region into the inlet of the duct and to prevent the separation of flow within the duct which might otherwise adversely affect the ability of the duct to generate the contra-rotating flows at its outlet. The body of the device may as such be swept (i.e. with the centroid of the outlet being aft of the centroid of the inlet with respect to the direction of free stream flow over the aerofoil) and canted (i.e. with the centroid of the outlet being outboard of the centroid of the inlet).

Where appropriate, the figures are described with reference to Cartesian coordinate axes. In line with convention, the x-axis extends along the longitudinal extent of the fuselage of the aircraft. The y-axis is perpendicular to the x-axis and extends along the general spanwise direction of the aircraft. The y-axis need not necessarily be parallel to the wings of the aircraft: the wings may be swept for example. The z-axis is orthogonal to both the x and y-axes.

Figure 3:
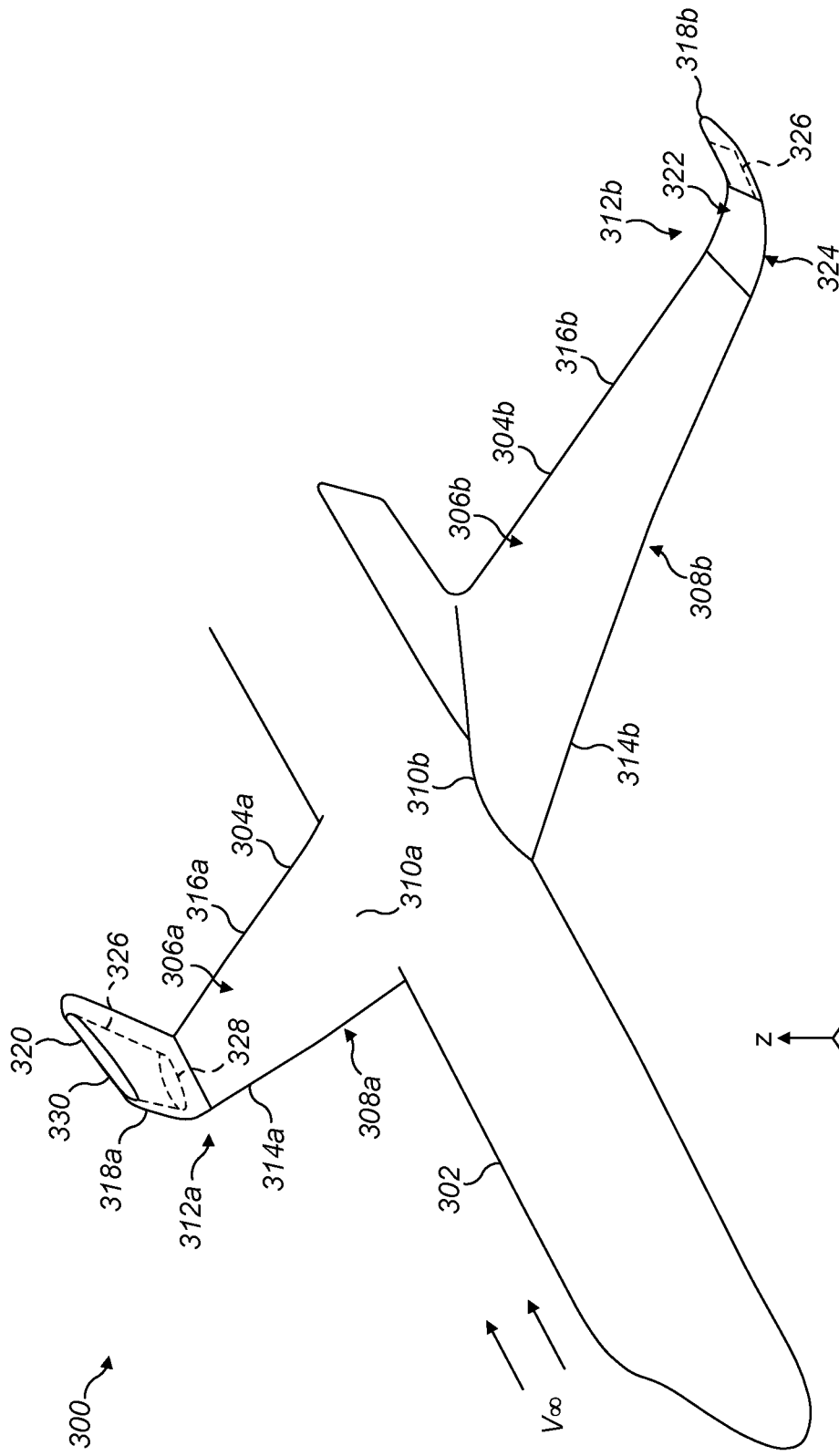
FIG. 3 shows a diagram of an aircraft equipped with structures for influencing the wake of its wings.

FIG. 3 shows an aircraft 300. The aircraft comprises a fuselage 302 and wings $304_a$ and $304_b$. The oncoming fluid flow relative to the aircraft is denoted $V_\infty$. Each wing has an upper surface $306_{a,b}$ and a lower surface $308_{a,b}$. When the wing generates lift, the upper surface is in a region of relative low pressure and the lower surface is in a region of relative high pressure. The pressure differential is caused by the flow of the fluid over the wing during normal use of the aircraft (e.g. during flight and at a suitable angle of attack). The wings of the aircraft have a root end $310_{a,b}$ and a tip end $312_{a,b}$. Each wing further comprises a leading edge $314_{a,b}$ and a trailing edge $316_{a,b}$. The leading edge is the foremost edge of the wing. It is the edge that first comes into contact with the oncoming fluid flow. The trailing edge is the rear or aftmost edge of the wing.

The root end may refer to the end of the wing disposed at or in the vicinity of the fuselage. The portion of the wing disposed at the root end may as such be referred to as the root. The tip end may refer to the end of the wing furthest or further from the fuselage. It may refer to the region of the wing in which the outer extremity of the wing is disposed. The outer extremity of the wing may as such be referred to as the tip of the wing. The tip and root of the wing may be the extrema of a range of positions along the general spanwise direction of the aircraft. These positions may be referred to herein as inboard and outboard. As conventionally understood, 'inboard' may refer to positions or locations towards or in the vicinity of the centreline of the aircraft, or towards the root end of the wing. 'Inboard' may also be used in a directional sense to define the orientation of a surface or component. For example, an inboard surface may be one which faces in the general inboard direction towards the centreline of the aircraft and/or towards the root end of the wing. That is, an inboard surface may have a surface normal in the general inboard direction. Similarly, 'outboard' may be used in a directional sense to define the orientation of a surface or component. For example, an outboard surface may be one which faces in the general outboard direction towards the wingtip and/or tip end and away from the centreline of the aircraft. An outboard surface may have a surface normal in the general outboard direction. Inboard and outboard may also be used in a relative sense to indicate the location of a surface or component. For example, an inboard surface/feature/component may be positioned between an outboard component and the root end. Similarly, an outboard surface/feature/component may be positioned between an inboard component and the tip end.

The wings comprise a pair of structures, or devices, $318_{a,b}$ for influencing the wake flow of the wings. The structures comprise a body 320 located in the vicinity of the tip of the wing. The exterior of the body is generally of aerofoil shape and comprises a low pressure surface 322 and a high pressure surface 324. The body is elongate along the x-axis, and also along the z-axis or more preferably along a direction having components in the z and y-axes. The high pressure surface is in the region of high pressure under the wing and the low pressure surface is in the region of low pressure above the wing. The body further comprises a duct 326 extending therethrough between a first opening 328 and a second opening 330. The first opening is located on the high pressure side of the wing and the second opening is located on the low pressure side of the wing. That is, the first opening is positioned in the region of high pressure under the wing and the second opening is positioned in the region of low pressure above the wing. The first opening is located on the high pressure surface 324 of the body.

The body could extend substantially upward from the wingtip, but in the present example the body is shaped so as to be swept and canted. The first and second openings may therefore be arranged so that the centroid of the second opening is aft and outboard of the centroid of the first opening. As a result, when fluid flows across and through the structure 314, the first opening entrains the oncoming fluid and the duct directs this fluid outboard (due to the sweep of the body), rearwards and upwards (due to the cant of the body) towards the second opening. The first opening therefore operates as an inlet and the second opening operates as an outlet, or exhaust. As will be explained in more detail below, the duct permits an airflow therethrough that inhibits the spanwise flow of fluid around the wingtip and directs the flow into a pair of counter-rotating streams of substantially equal magnitude externally of the duct in the vicinity of the wing's trailing edge. These counter-rotating streams substantially cancel each other in the vicinity of the wing's trailing edge thereby inhibiting the formation of wingtip vortices.

Figure 4:
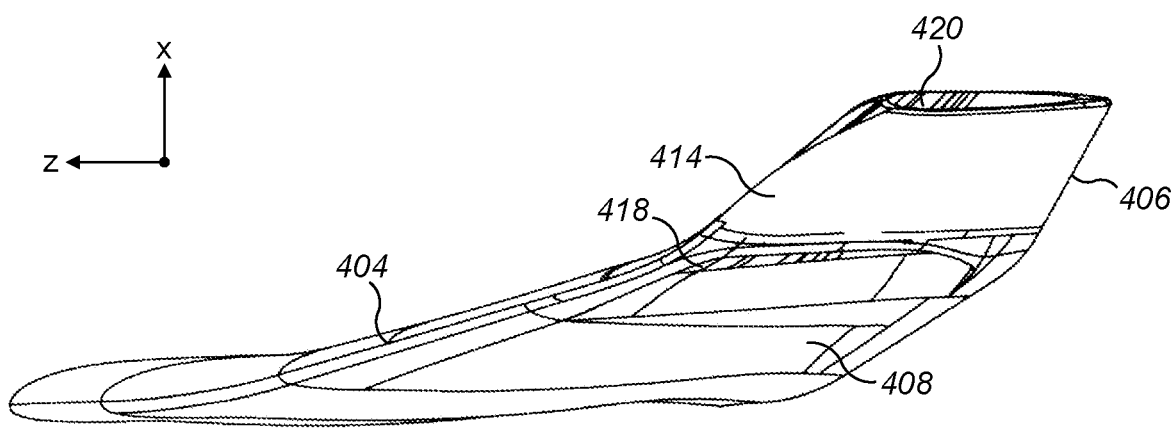
FIG. 4 shows a side view along the inboard direction of a structure for influencing the wake of an aerofoil.
Figure 5:
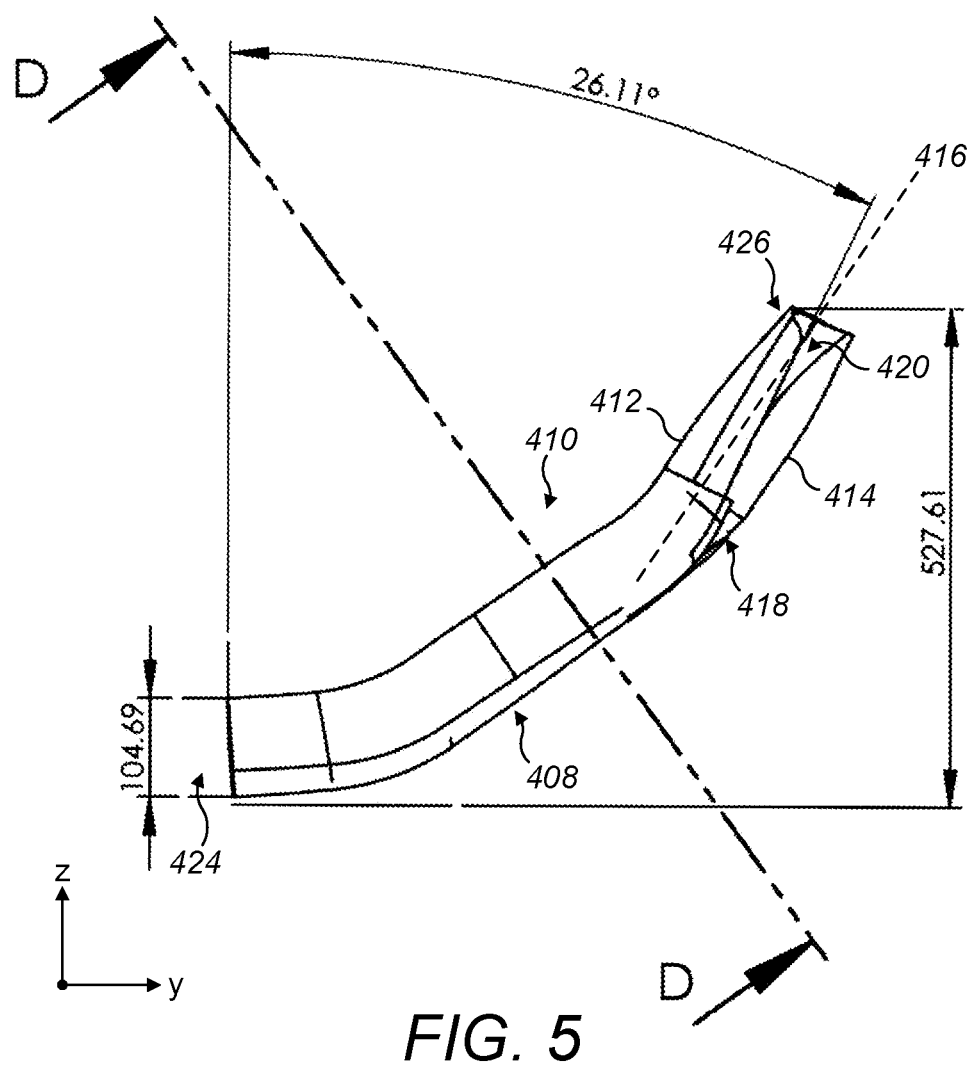
FIG. 5 shows a front view of a structure for influencing the wake of an aerofoil.
Figure 6:
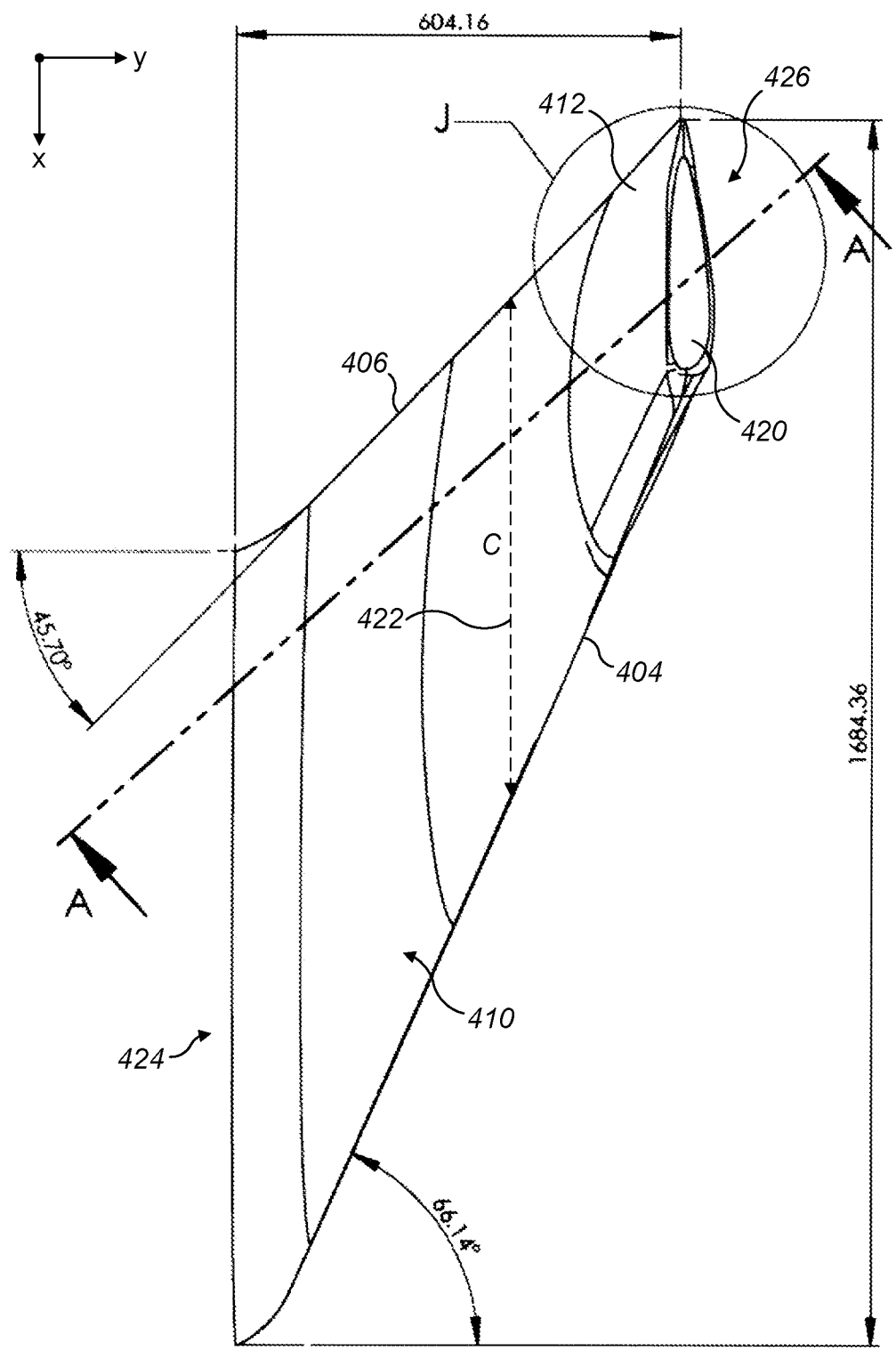
FIG. 6 shows a plan view of a structure for influencing the wake of an aerofoil.
Figure 7:
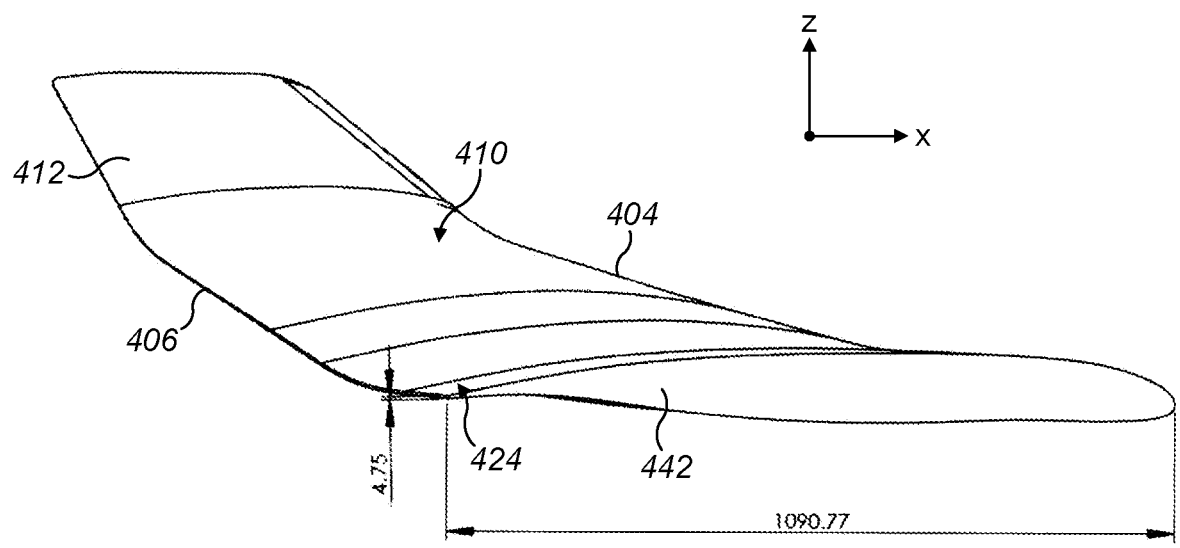
FIG. 7 shows a side view along the outboard direction of a structure for influencing the wake of an aerofoil.
Figure 8:
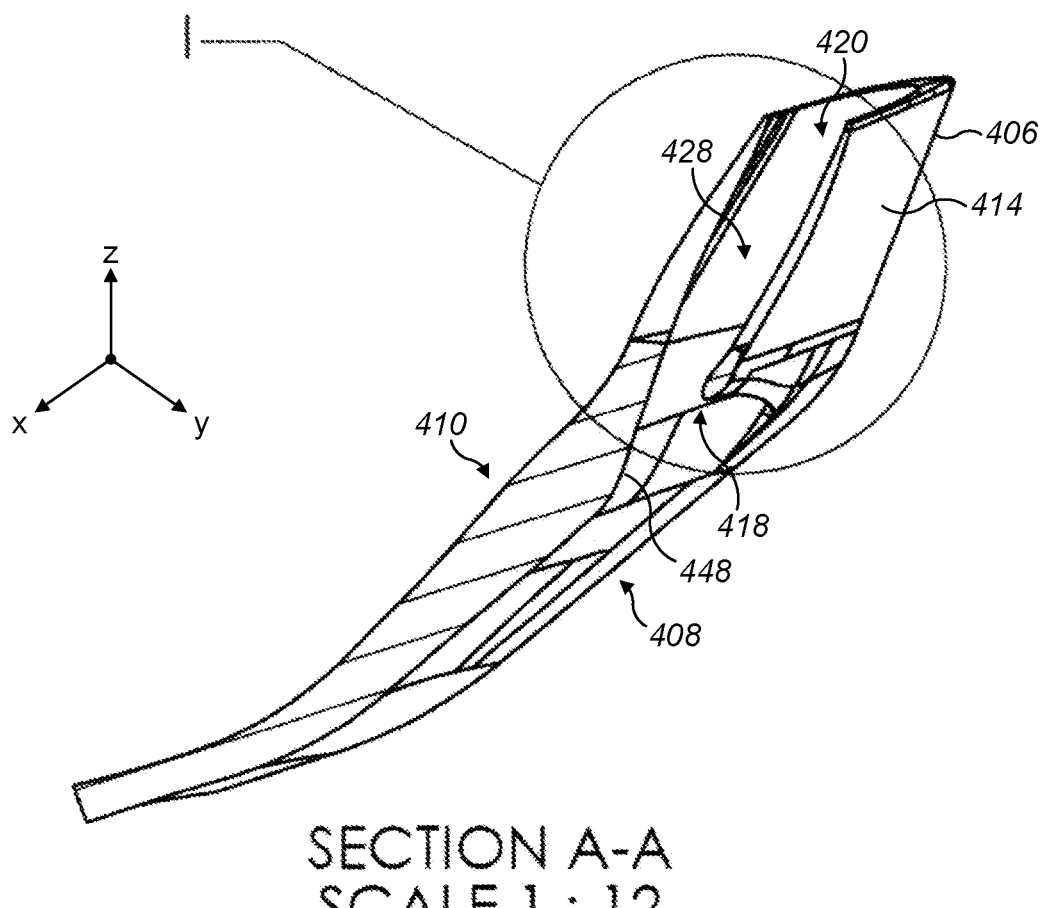
FIG. 8 shows a cross-sectional view of the structure for influencing the wake of an aerofoil.

Examples of the structure, or device, for influencing the wake flow of the aircraft wing are described in more detail with reference to FIGS. 4 to 8. FIG. 4 shows the structure 400 in side view along the inboard direction; FIG. 5 shows the structure in front view; FIG. 6 shows the structure in top, or plan view, FIG. 7 shows the structure in side view along the outboard direction and FIG. 8 shows the structure in cross-section in a plane perpendicular to the x-axis. These figures (and other figures described herein) contain dimensions of the structure. It is to be understood that these dimensions are merely an example and various other dimensions may be used without departing from the principles described herein. The dimension of the structure may for example depend upon the aerofoil and/or aircraft to which the structure is attached or integrally formed with.

The structure 400 comprises a body 402. The body is shaped, or dimensioned, so as to generate lift when subjected to an oncoming fluid flow, and as such may be referred to as being of an aerofoil shape. It extends in a spanwise direction (in these examples it has a span of approximately 600 mm). The body has a leading edge 404 and a trailing edge 406. It has an inboard end 424 and an outboard end 426. It further has a lower side 408 and an upper side 410. When the structure is used with an aircraft wing and subjected to an oncoming fluid flow (and potentially at a suitable angle of attack), the upper side 410 is in the region of relative low pressure and the lower side 408 is in the region of relative high pressure. The lower side 408 may therefore be referred to as the high pressure side of the body, and the upper side 410 may be referred to as the low pressure side of the body. Both the high pressure side and the low pressure side extend between the leading edge and trailing edge of the body.

As best seen with reference to FIGS. 5 and 6, the body is canted and swept. In these examples the leading edge of the body 404 forms a sweep angle of approximately 66 degrees. The body may have increasing degrees of cant along its spanwise extent in the outboard direction. That is, the outboard end of the body may be disposed at a greater cant angle than the inboard end of the body. In these examples the maximum cant angle of the body is approximately 26 degrees. Because the body is swept and canted, it has a chord length which is a function of the position along the body's span. As can be seen with reference to FIG. 6, the chord length decreases in the outboard direction towards the tip of the body.

The body comprises at its outboard end opposing outer, or external, surfaces 412 and 414. Outer surface 412 forms part of the low pressure side of the body and outer surface 414 forms part of the high pressure side of the body. The outer surfaces may be symmetrical or near symmetrical about an axis 416, and may extend along the chordwise direction of the body. Axis 416 may define the maximum cant angle of the body. The outer surfaces may additionally be cambered. The camber of the outer surfaces may be greater than the camber of the remaining surfaces of the upper side 410 and lower side 408. That is, the outer surfaces 412 and 414 may have a camber angle that exceeds that of the remaining surfaces forming the upper and lower sides of the body.

The body further comprises an intake surface 448 on the high pressure side of the body that feeds into a duct 428 extending through the body from a first opening 418 to a second opening 420 (best seen with reference to FIG. 8). The first opening is located in the high pressure region below the wing and the second opening is located in the low pressure region above the wing. The first opening is located on the lower side of the body. It may be located at the base of the outer surface 414. The second opening is located on the low pressure aspect of the wing. The body may be shaped so that the centroid of the second opening is vertically above the centroid of the first opening (i.e. the centroids have the same x and y coordinates), but in this example the body is shaped so that the second opening is located outboard and aft relative to the first opening on the high pressure aspect of the wing. The duct therefore extends in an outboard and aft direction from the first opening to the second opening. The intake surface 448 may similarly extend generally in the outboard and upwards direction towards the duct inlet and may therefore be swept relative to the chordline of the body.

Figure 9:
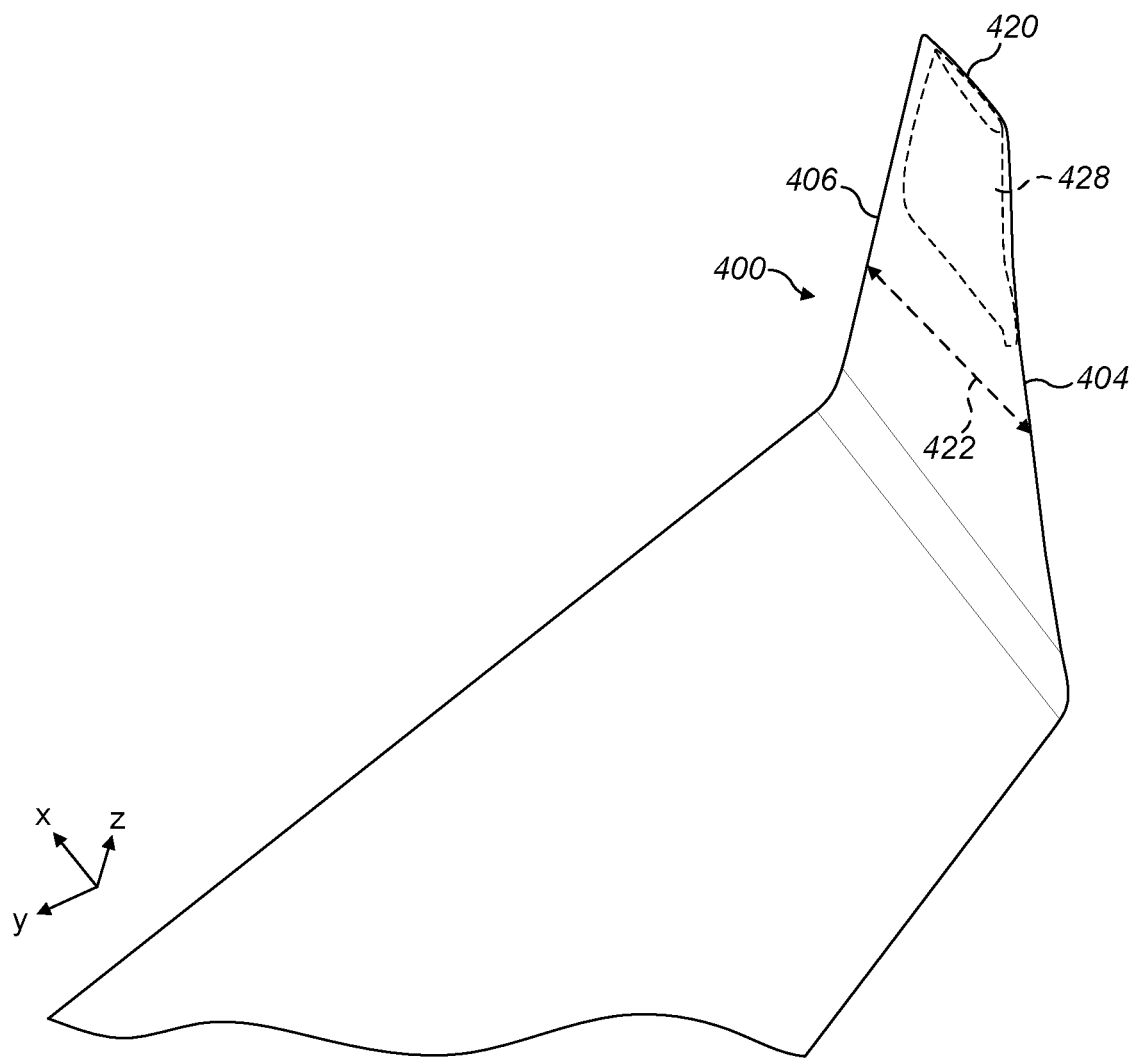
FIG. 9 shows a view of the duct housed within the structure.
Figure 10:
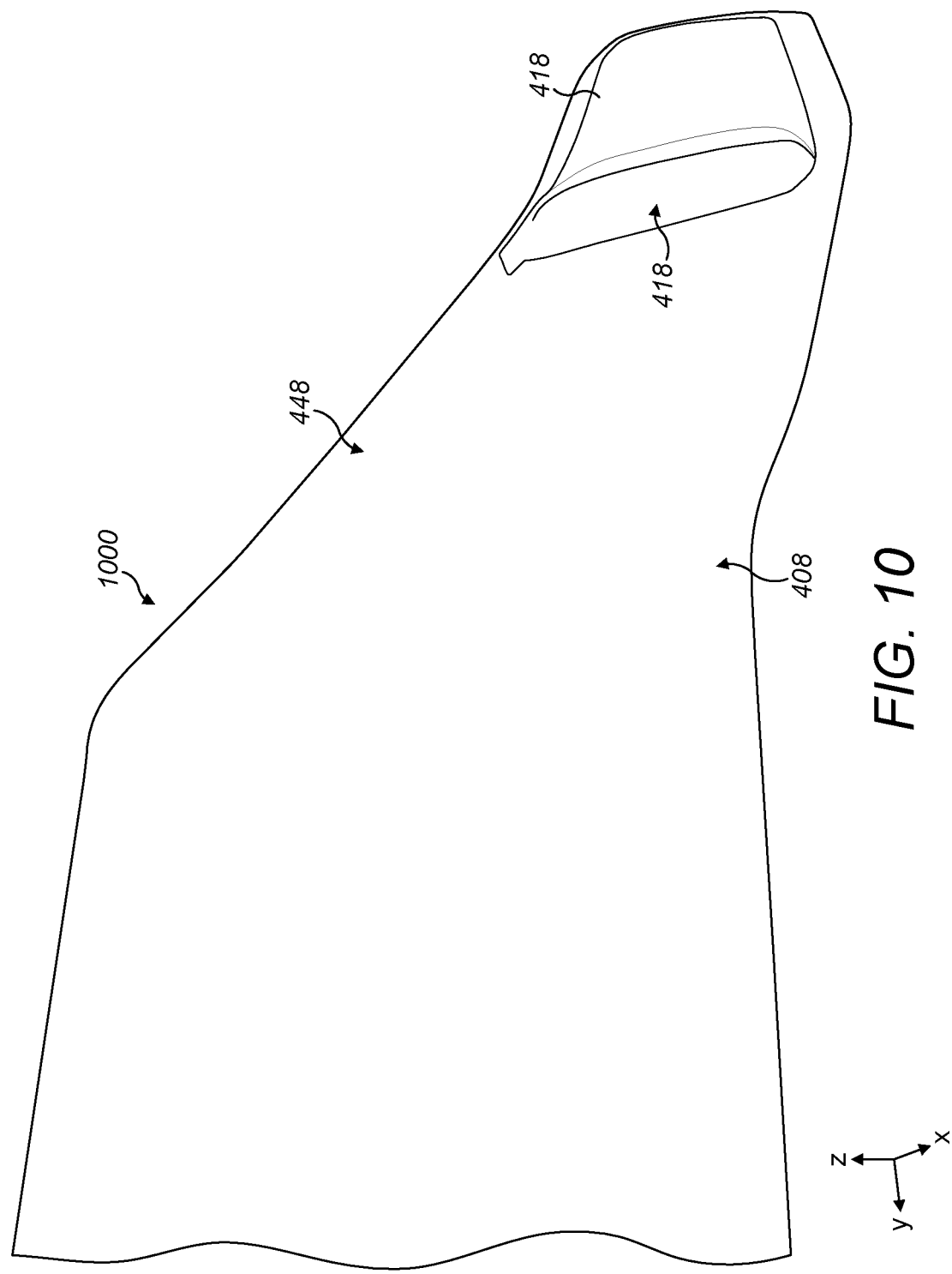
FIG. 10 shows an alternate view of the duct housed within the structure.
Figure 11:
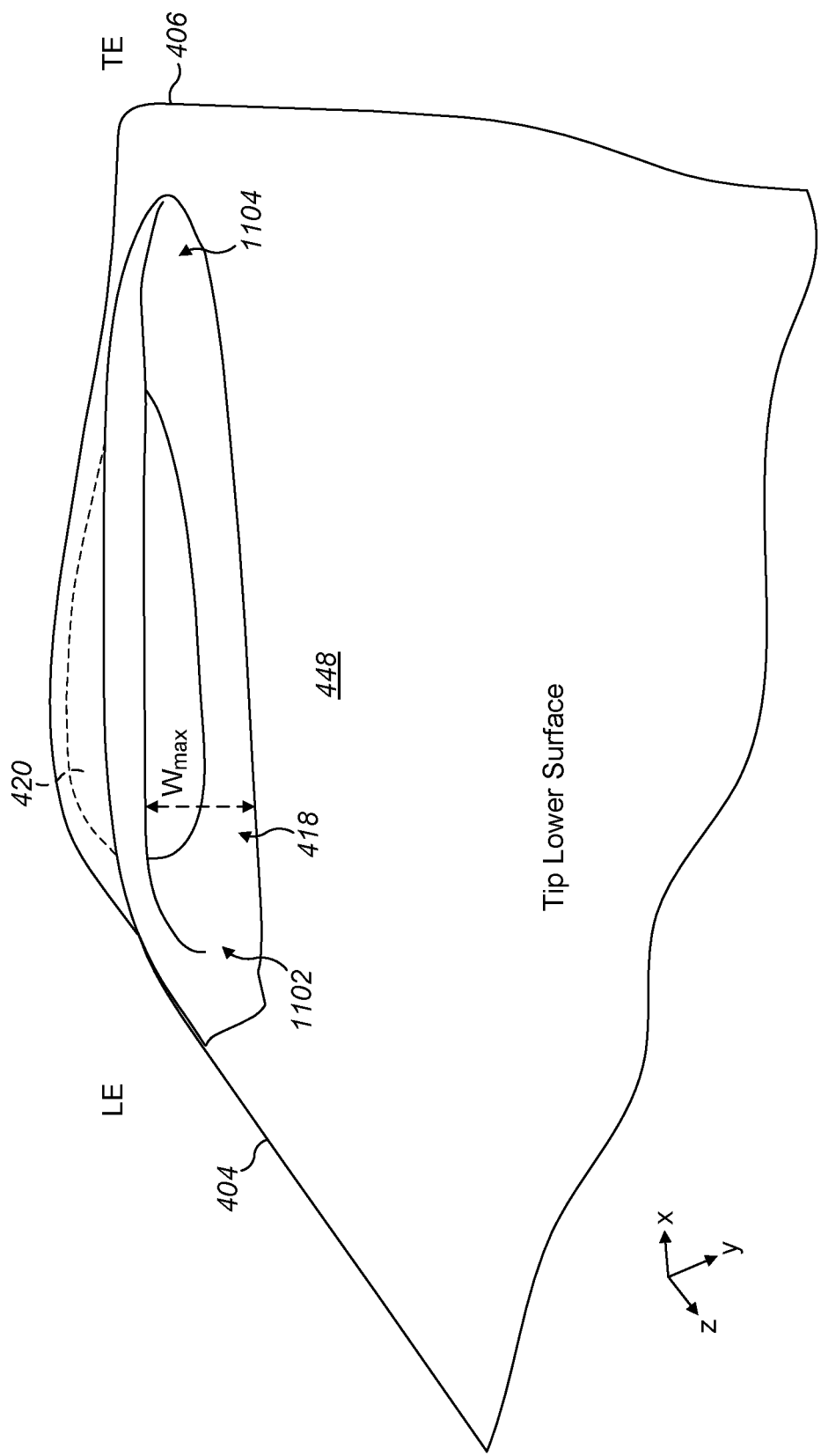
FIG. 11 shows a view along the direction of the duct in the direction from the inlet to the outlet.

Various views of the duct are shown in FIGS. 9 to 11. FIG. 9 shows the tip region of an aircraft wing with the wake-influencing device indicated at 400. The duct housed within the body of the device is illustrated at 428. FIG. 10 is a view of the underside of a wing 1000 illustrating the duct's first opening 418 on the high pressure aspect of the wing. This view illustrates how the intake surface 448 feeds into the duct. FIG. 11 shows a view through the duct along the direction from the first opening 418 towards the second opening 420.

It can be seen with reference to FIGS. 9 to 11 that the first and second openings may extend along the chord length of the body or a substantial part thereof. The duct may therefore extend along the full chord length of the body (or a substantial part thereof). The chord length of a chord C at an arbitrary position within the duct is shown at 422 for the purposes of illustration in FIGS. 6 and 9. The first opening may be generally orientated along the chord line of the body (i.e. the opening is oriented along the general direction of the chord of the body). The first opening may be swept relative to the chord line of the body. It may for example be oriented, or inclined, outboard by approximately 5 degrees relative to the chord line of the body. It has been found that this is an effective arrangement for entraining oncoming fluid through the first opening into the duct.

As best seen with reference to FIG. 11, the width of the first opening may vary as a function of position along the chord of the body. That is, the width of the first opening may vary along its length. The width may increase and decrease along the chord of the body in a rolling arrangement. The front, or leading, edge of the opening is shown at 1102, and the rear edge shown at 1104. The front edge of the opening is the edge located in the vicinity of the leading edge of the body 404. The rear edge of the opening is the edge located in the vicinity of the trailing edge of the body. The width of the opening, w, increases from the front edge along the chordwise direction before reaching a maximum width $w_{max}$. Thereafter, the width of the opening decreases along the chord direction towards the rear edge. An opening with a rolling width profile and that is swept relative to the chord line of the body may be referred to as rolling-swept intake. As will be explained in more detail below, it is believed that a rolling-swept intake may be effective at entraining oncoming fluid into the duct.

Figure 12:
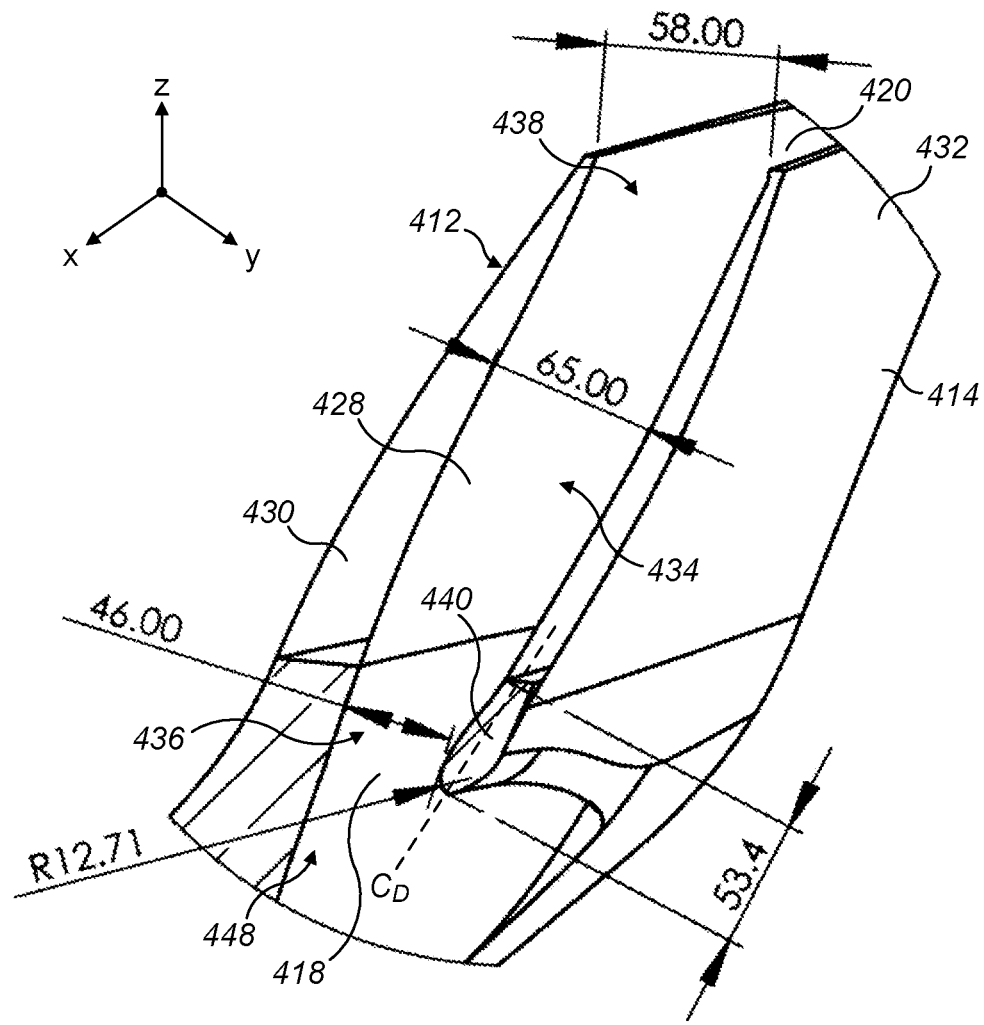
FIG. 12 shows an enlarged view of the duct illustrated in FIG. 8.

The duct 428 is shown in more detail in FIG. 12, which shows an enlarged view of the region 1 in FIG. 8. The duct is defined by walls, or boundaries, which form part of the body. These walls further define the opposing outer surfaces 412 and 414: that is, the interior surface of the wall defines the duct, and the exterior surface of the wall defines the opposing outer surfaces. The duct is defined by an inboard wall 430 and an outboard wall 432. The inboard and outboard walls may be formed from a continuous, or single, surface. In that case, the 'inboard' wall may refer to the portion of the continuous wall that is on the inboard side, and the 'outboard' wall may refer to the portion of the continuous wall that is on the outboard side.

The duct comprises a plenum 434 located between the first and second openings, and a first restriction 436 located between the plenum and the first opening. The duct additionally comprises a second restriction 438 between the plenum and the second opening. The width of the second restriction may be larger than the first restriction, but smaller than the width of the plenum. In FIG. 12 the diameter of the first restriction is approximately 46 mm, the diameter of the plenum approximately 65 mm and the diameter of the second restriction approximately 58 mm. These dimensions are merely an example. The restrictions may act as a throat, or venturi. The duct may therefore be described as comprising a venturi in the vicinity of the first opening that expands into the plenum, with the plenum reducing to a second venturi in the vicinity of the second opening. The duct thus has a converging-diverging-converging profile along its extent between the first and second openings. The inboard board wall 430 may be concave so as to at least in part define the restrictions and plenum.

The outboard wall of the duct 432 may define a fluid-arresting structure, or formation, 440 that, when the aerofoil is exposed to oncoming fluid flow, generates a region of relative high pressure within the duct. This will be explained in more detail below. The structure 440 may be located in the vicinity of the first opening. In this example the fluid arresting structure defines the outboard edge of the duct's first opening. The inboard side of the duct's first opening is formed from the intake surface 448. The fluid-arresting structure may be any suitable abrupt formation (e.g. it may be mushroom shaped, or rectangular), but in this example is a convex portion of the outboard wall of the duct. Thus the camber of the convex surface in part defines the duct's first restriction. The fluid-arresting structure may therefore be said to be in the shape of an aerofoil nose section, i.e. the structure may be shaped similarly to the front portion of an aerofoil that encompasses the aerofoil leading edge. The nose section may define a leading edge radius, in this example of approximately 12 mm.

The aerofoil structure 440 may have an associated chordline CD that extends into the duct towards the second opening. That is, the chordline of the structure lies in a direction parallel to, or approximately parallel to, the longitudinal direction of the duct between the first and second openings. The chordline may therefore be parallel, or approximately parallel to the maximum cant angle of the body. The structure may be oriented so that its leading edge is in the vicinity of the first opening. The structure may further extend across the duct in a direction generally parallel to the chordline of the body. Thus the structure may extend generally along the x-axis. It may extend across the full chord length of the duct.

In these examples the structure 400 for influencing the wake is a standalone component capable of being fitted to the tip, or outboard end, of an aircraft wing. The structure may as such comprise an inboard surface 442 (best seen with reference to FIG. 7) that has a mating region configured to conform to the shape of the corresponding portion of the wing tip. The mating surface 442 of the device may for example be configured to exactly mate with a corresponding surface of the wing to which it is to be attached. It will be appreciated that the structure 400 may alternatively be integrally formed with the aircraft wing so as to form part of the wing.

Figure 13:
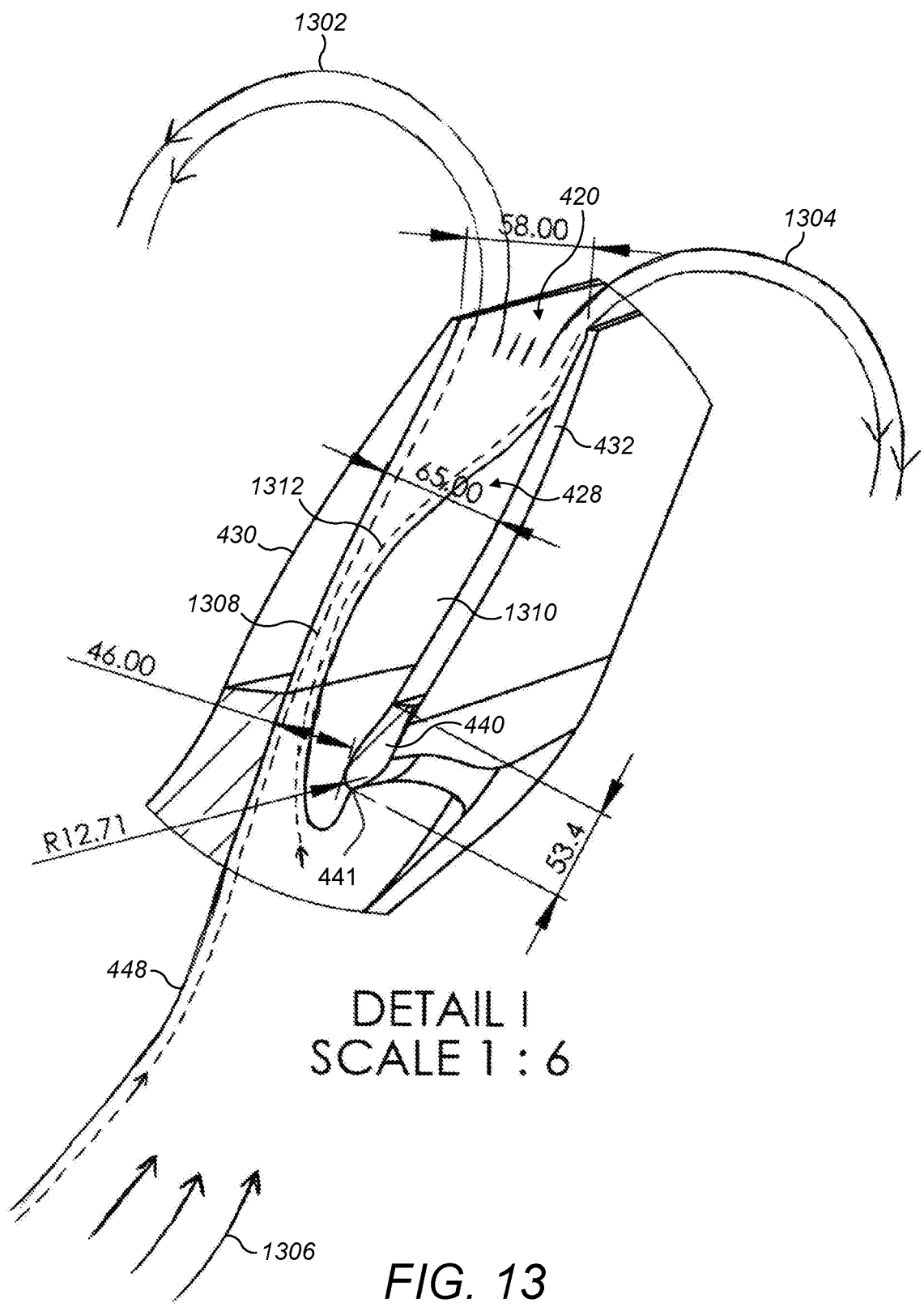
FIG. 13 illustrates streamlines of the fluid flow through the duct when the structure is subjected to an oncoming fluid flow at a freestream velocity.

FIG. 13 illustrates the streamlines of fluid flowing through the duct in normal operation. 'Normal operation' may refer to the wake-influencing structure 400 being attached to or otherwise forming part of an aircraft wing subject to an oncoming fluid flow at a freestream velocity. 'Normal use' may refer to the aircraft being at cruising speed, or when the aircraft is ascending (i.e. during the climbing phase of a flight) or descending (i.e. during the landing phase of a flight). As illustrated, fluid flows into the duct through opening 418 on the high pressure side and exits the duct through the opening 420 on the low pressure side. The first opening 418 may therefore be referred to as an inlet, and the second opening 420 may therefore be referred to as an outlet, or exhaust. The duct is configured so that the fluid exiting the exhaust is in the form of two rotating flows 1302 and 1304 that extend substantially in the direction of the freestream flow to which the wing is subjected.

The oncoming fluid (indicated generally at 1306) may be entrained into the duct by the intake surface 448 and rolling-swept inlet 418. The sweep angle of the inlet relative to the chordline of the body (which may be approximately 5 degrees) may assist in entraining the oncoming fluid flow. The intake surface 448 is smoothly curved and extends generally in an upward and outboard direction towards the second opening to encourage part of the fluid flow through the duct to remain attached to the inboard wall. The attached flow is indicated by the dashed markings at 1308. In addition, the intake surface is contoured so as to cause part of the incoming fluid through the duct along the inboard side to adopt a rotational component. That is, the transition of the attached flow along the intake surface towards the duct inlet imparts a vorticity into the flow. In this example the intake surface 448 is generally convex so as to impart an anti-clockwise rotational component into the attached flow, Because the flow 1308 along the intake surface and along the inboard wall of the duct remains attached, the part of the fluid flow that enters the duct through the inboard side of the inlet has a velocity close to, or approximately equal to, the freestream velocity of the oncoming flow. More specifically, CFD studies have found that for a free stream velocity of 202 ms$^{-1}$, the velocity of a stream tube entering the duct at its inboard side was approximately 190 ms$^{-1}$.

The fluid-arresting formation 440 on the outboard wall of the duct facilitates a reduction in velocity of the entrained fluid and thus an increase in fluid pressure within the duct. The structure 440 thus generates a region of relative high pressure within the duct, indicated at 1310. Due to the location of the fluid-arresting formation on the outboard side of the duct, the velocity of the fluid entering the duct is reduced within the outboard region of the duct inlet. The fluid-arresting structure, in contrast to the smoothly curved intake surface, is an abrupt formation that may reduce the velocity of fluid entering the duct by encouraging a turbulent flow (and thus a thickening of the boundary layer) in the duct's outboard region in the vicinity of the inlet. Thus the generated region of high pressure may be localised within the duct. That is, the region of high pressure may occupy a sub-volume, or sub-region, of the duct. As such, the region of high pressure may be referred to as a high pressure core. In this example the fluid-arresting structure generates a high pressure core that exists within the duct's first restriction and plenum, and is locate in situ on the outboard side of the duct. The region of relative high pressure therefore generates a fluid pressure and velocity imbalance between the inboard and outboard sides of the duct within the first restriction and plenum.

The structure 400 may be trip stripped around the radius of its nose. This may assist in facilitating the reduction in velocity of the entrained fluid be encouraging the development of the turbulent flow. The trip strip 441 may extend across the structure in the chordwise direction. For use of the structure 400 with a commercial airliner, suitable dimensions of the trip strip 441 may for example be approximately 1 mm in depth and a surface area coverage within the duct of between approximately 18,000 mm$^2$ and 36,000 mm$^2$.

The duct 418 has a cross-sectional area profile (i.e. the cross-sectional area varies as a function of position along the duct in the general longitudinal direction) that causes the high pressure region 1310 to adopt an aerofoil shape that is oriented generally along the longitudinal direction of the duct. In particular, the interaction of the relatively low pressure region on the inboard side of the duct and the increase in the duct's cross-sectional area from the first restriction into the plenum causes the high pressure region to adopt the aerofoil shape. In other words, the boundary of the relative high pressure region is convex.

Figure 14:
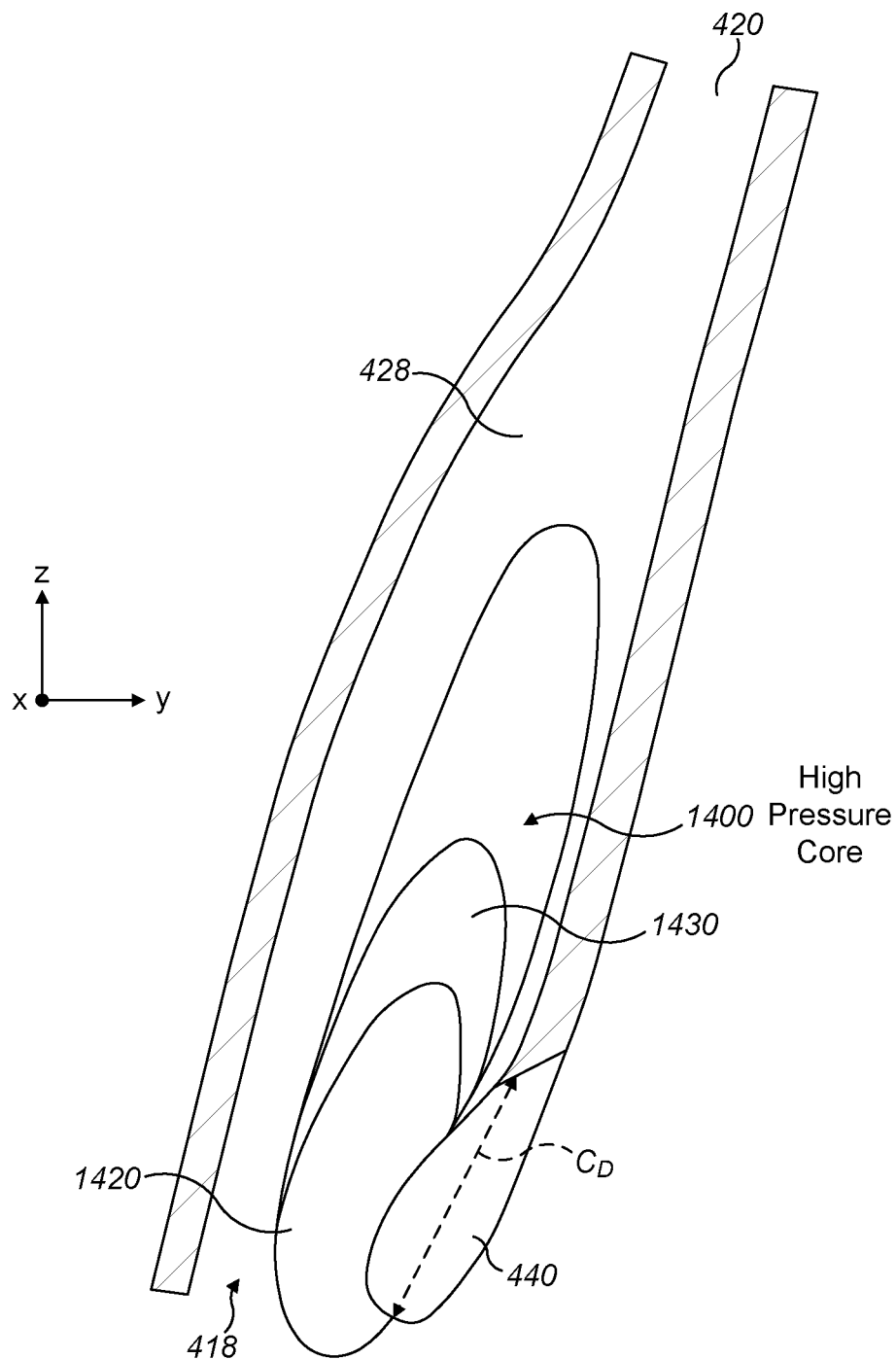
FIG. 14 is a schematic illustration of a high pressure region generated within the duct when the structure is exposed to an oncoming flow.
Figure 15:
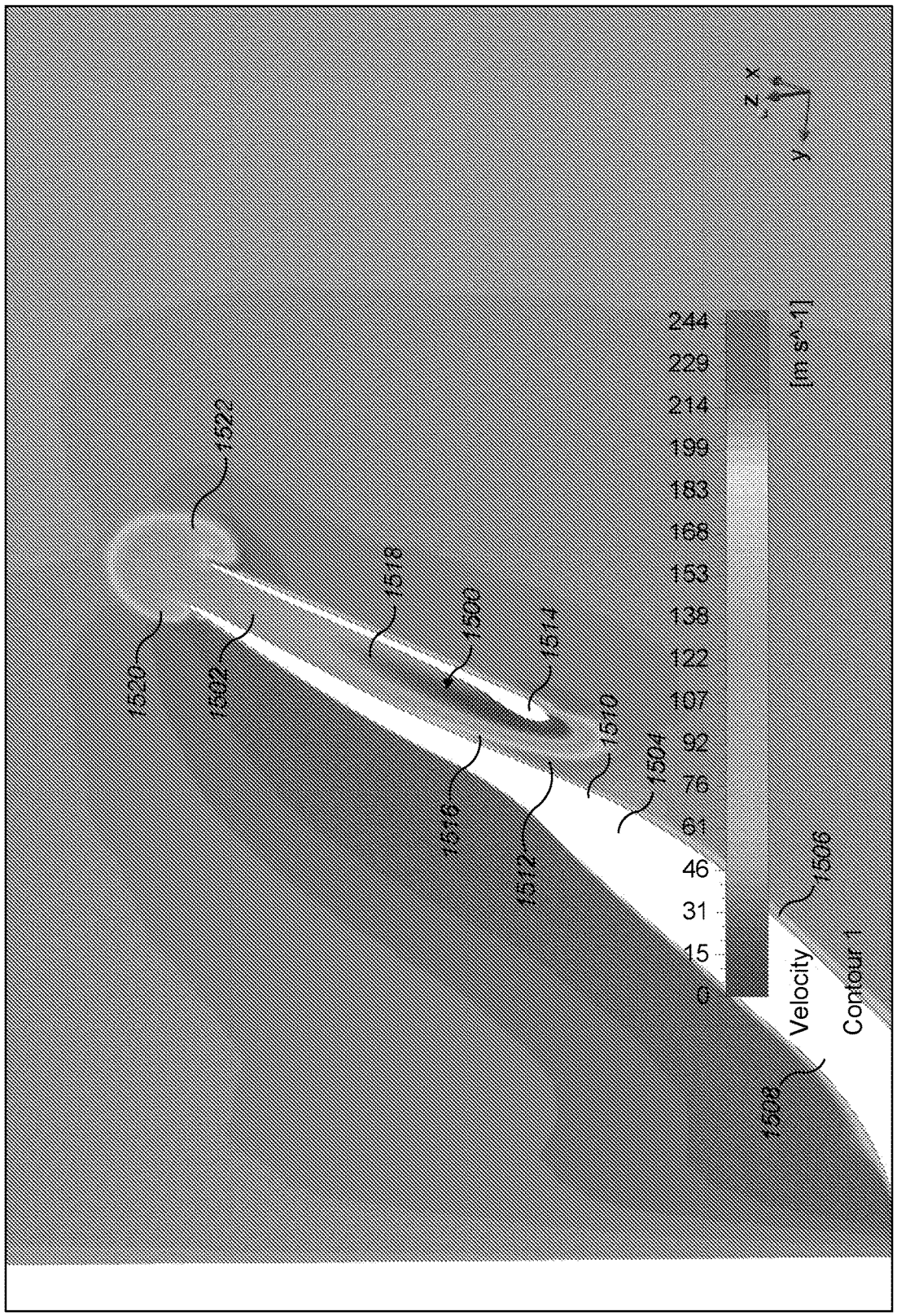
FIG. 15 is an image of the pressure field within a duct obtained from Computational Fluid Dynamics (CFD) analysis on an ERJ145 jet airliner cruising at 36,000 feet at Mach 0.686.

FIGS. 14 and 15 show the high pressure core in more detail. FIG. 14 shows a schematic illustration of the high pressure core and FIG. 15 shows the pressure field obtained from CFD analysis within a duct designed by the inventor and fitted to Embraer ERJ145 wing exposed to a freestream velocity of approximately 200 $ms^{-1}$.

In FIG. 14 the high pressure core is indicated generally at 1400. The core is shown as extending along approximately 50-70% the length of the duct. Within the high pressure core 1400, the magnitude of the fluid velocity is less than approximately 60 $ms^{-1}$ when the freestream velocity of the oncoming fluid flow is between 190 $ms^{-1}$ and 210 $ms^{-1}$. The fluid velocity/pressure may not be constant within the core but the core may instead exhibit a pressure/velocity gradient therein. In this example the core contains a first sub-region 1420 wherein the fluid velocity is less than approximately 15 $ms^{-1}$, and a second sub-region 1430 wherein the fluid velocity is less than approximately 30 $ms^{-1}$. The first and second sub-regions may be in a nested arrangement (in this case the first sub-region is nested within the second sub-region).

FIG. 15 shows the high pressure core indicated generally at 1500 within duct 1502. The body housing the duct is indicated generally at 1504, and has a high pressure side 1506 and a low pressure side 1508. Intake surface 1510 feeds into the duct inlet 1512. The fluid-arresting structure that contributes to the development of the high pressure core is shown at 1514. It can be seen that within the high pressure core the fluid velocity is less than approximately 50 $ms^{-1}$. As discussed above, the high pressure core adopts an aerofoil shape with a boundary that is convex. The core 1500 comprises a plurality of approximately isobaric regions in a nested arrangement with a pressure/velocity gradient such that the inner regions are of higher pressure/lower velocity than the outer regions. The pressure field shows that within a region of the core the fluid velocity is less than 15 $ms^{-1}$. The pressure field further illustrates the fluid velocity/pressure imbalance between the inboard 1516 and outboard 1518 sides of the duct.

Referring back to FIG. 13, part of the fluid flow through the duct (denoted 1312) adopts streamlines that follow the aerofoil shape of the high pressure region thereby causing that fluid flow to adopt a clockwise rotational component. In other words, part of the inlet flow 1312 (of relative low pressure) follows the camber prescribed by the high pressure region towards the plenum and adopts a rotational component opposite in direction to the fluid flow along the inboard direction. In this manner the region of high pressure within the duct causes part of the fluid flow therethrough to adopt a rotational component.

Thus within the first restriction and plenum there exist two characteristic flows: one flow possessing a clockwise vorticity bias in the outboard region of the duct and one flow possessing an anticlockwise vorticity bias in the inboard region of the duct. As these flows of dissimilar velocity/pressure pass through the plenum chamber towards the second restriction they adopt similar pressures/velocities. This is caused by the pressure of the fluid in the outboard region of the duct decreasing along the longitudinal direction towards the duct outlet 420 as the fluid accelerates through the second restriction 438. The second restriction therefore operates to equalise the fluid pressure/velocity imbalances between the inboard and outboard regions of the duct and to cause the mass flow rates of the two characteristic flows to be substantially equal.

As the fluid flow exits the duct via the second opening 420 into the relatively low pressure regions downstream and above the duct outlet it splits equally and separates to form a pair of opposing rotating flows 1302 and 1304 of substantially equal magnitude. Without prejudice to accepted theory, it is believed that these two counter rotating flows interact with each other leading to a cancellation of the vorticity in the flow output from the duct thereby causing the wake of the wingtip to prescribe irrotational streamlines. In other words the counter rotating flows are directed in such a way as to meet and substantially cancel the angular momentum of their respective flows downstream of the wing. Thus it is believed the duct operates to inhibit the effects of the wingtip vortices by causing the flow in the near downstream of the body to be irrotational. Referring briefly to FIG. 15, the counter-rotating flows that egress the duct can be seen at 1520 and 1522.

In other words, within the first restriction 436 and plenum 438 there is a fluid pressure and fluid velocity imbalance between the inboard and outboard sides of the duct due to the generated high pressure core. This pressure/velocity imbalance within the duct causes the fluid flows on the inboard and outboard side to be divergent, i.e. the fluid flows on both the inboard and outboard side of the duct are divergent. The divergent flows generated from the pressure/velocity imbalance within the duct are then accelerated by the second restriction and exit the duct through the second opening in the form of two rotating flows that rotate in opposite directions to each other. That is, the divergence of the flow within the duct is maintained as the fluid exits the duct and causes the exiting fluid to be in the form of two opposing vorticity flows. Without prejudice to accepted theory it is believed that the duct can be configured in such a way as to generate a high pressure core within the duct that leads to the creation of fluid flow within the duct with balanced divergent streamlines. When such a flow exits the duct through the second opening it may take the form of two opposing vorticity flows of substantially equal vorticity magnitude.

The body 402 may be configured so that its exterior surfaces are shaped, or contoured, to generate a pressure field in the region of the tip of the wing that pressure balances these two rotating flows. This pressure balancing may encourage the two rotating flows to interact so that their vorticities substantially cancel in the near downstream of the wing, reducing the induced drag of the aerofoil. In particular, CFD analysis has shown that for an Embraer ERJ145 regional airliner at 36,000 feet and Mach 0.686 (202.5 $ms^{-1}$), a wake-controlling device similar to that described above led to the cancellation of wingtip vortices at approximately 1.75 m aft of the wingtip trailing edge. This compares favourably with normal aerofoils comprising winglets, where wingtip vortices may be present in the aerofoil's wake for up to three kilometres.

The pressure balancing of the rotating flows generated by the duct may be achieved by the outer surfaces 412 and 414. In particular, surface 414 which forms part of the high pressure side of the body 408 may be cambered so as to generate a localised region of relative low pressure outboard of the fluid inlet 418 on the high pressure aspect of the wing. Similarly, surface 412 which forms part of the low pressure side of the body may be cambered so as to generate a localised region of relative low pressure inboard of the outlet 420 on the low pressure side that pressure balances the localised low-pressure region below the lower side of the body indicated in the region shown by 414. Thus when the two rotating flows exit the duct they are in a region of localised constant pressure which thereby prevents the flows from diverging from each other (which would potentially adversely affect their ability to interact).

Figure 1:
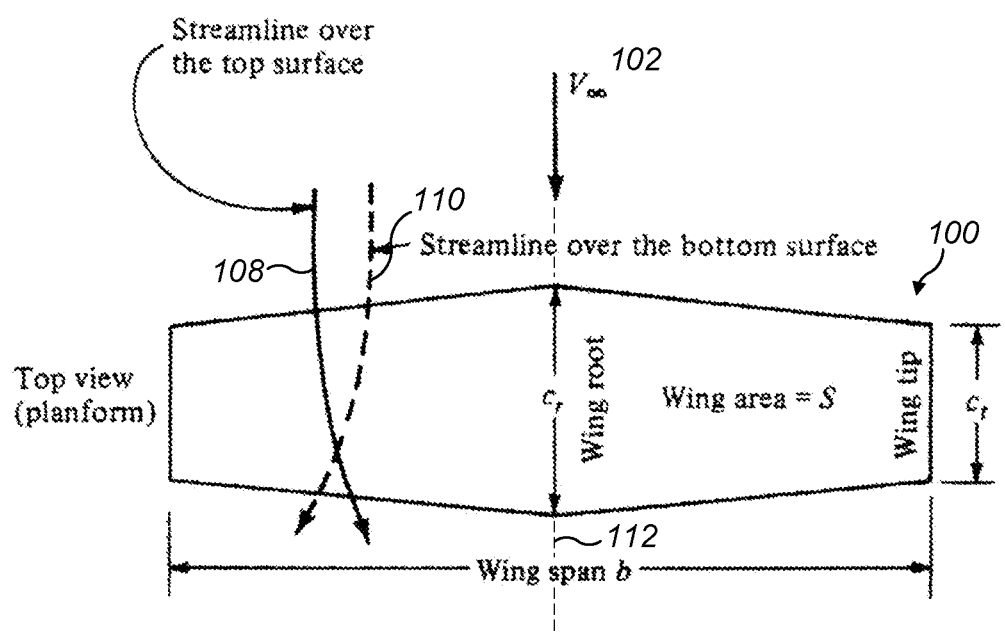
FIG. 1 shows a plan view of aircraft wings illustrating the formation of wingtip vortices and a trailing vortex sheet.
Figure 2:
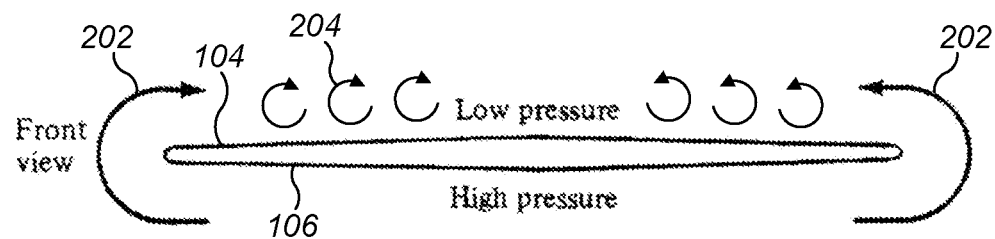
FIG. 2 shows a front view of aircraft wings illustrating the formation of wingtip and trailing edge vortices.

The body 402 may further be configured so as to inhibit the effects of the trailing vortex sheet shed from the trailing edge of the wing. It has been described above with reference to FIG. 1 that this vortex sheet may be generated from the interaction at the wing's trailing edge of the streamlines over the upper surface of the wing converging to the fuselage, and the streamlines over the lower surface of the wing diverging from the fuselage. It has been found that the localised region of relative low pressure generated by the cambered outer surface 412 at the outboard end of the upper side of the body 410 can oppose the positive pressure gradient that may exist along the upper surface of the wing in the outboard direction. By suitably cambering the outer surface 412, the generated low-pressure region operates to re-orientate the flow over the upper side of the body 410 towards the flow over the lower side of the body 408. In other words, the outer surface 412 operates to re-orientate the streamlines over the upper side of the body (and the aerofoil) to better, or more closely, match the streamlines over the lower side of the body (and aerofoil) by turning the streamlines outboard. Re-orienting the streamlines over the upper and lower surfaces may inhibit the creation of vortices at the trailing edge, thus potentially further reducing the induced drag of the wing.

Figure 16:
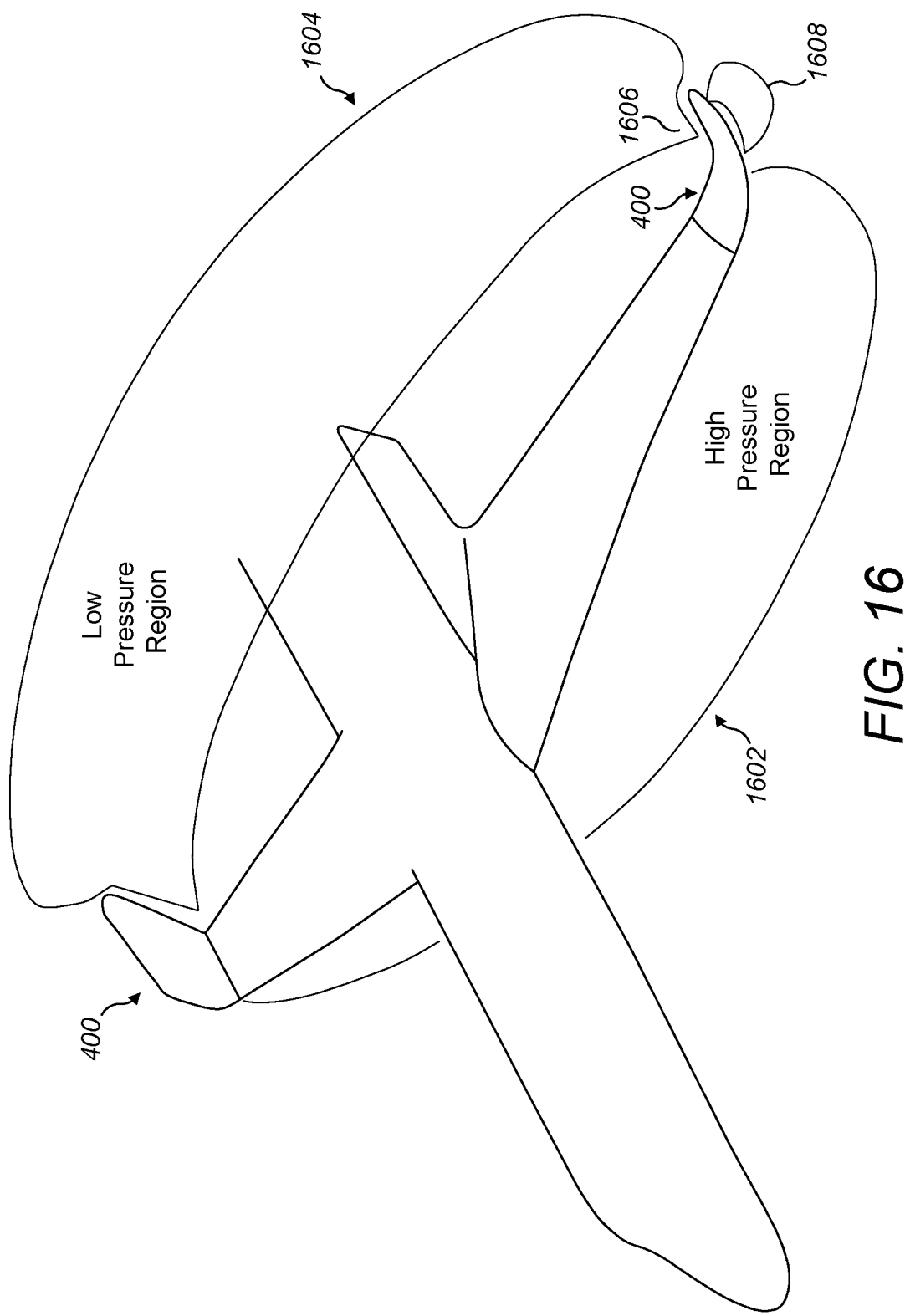
FIG. 16 is a schematic diagram of the pressure field around the wings of an aircraft equipped with the structure for influencing the wake of the wings.
Figure 17:
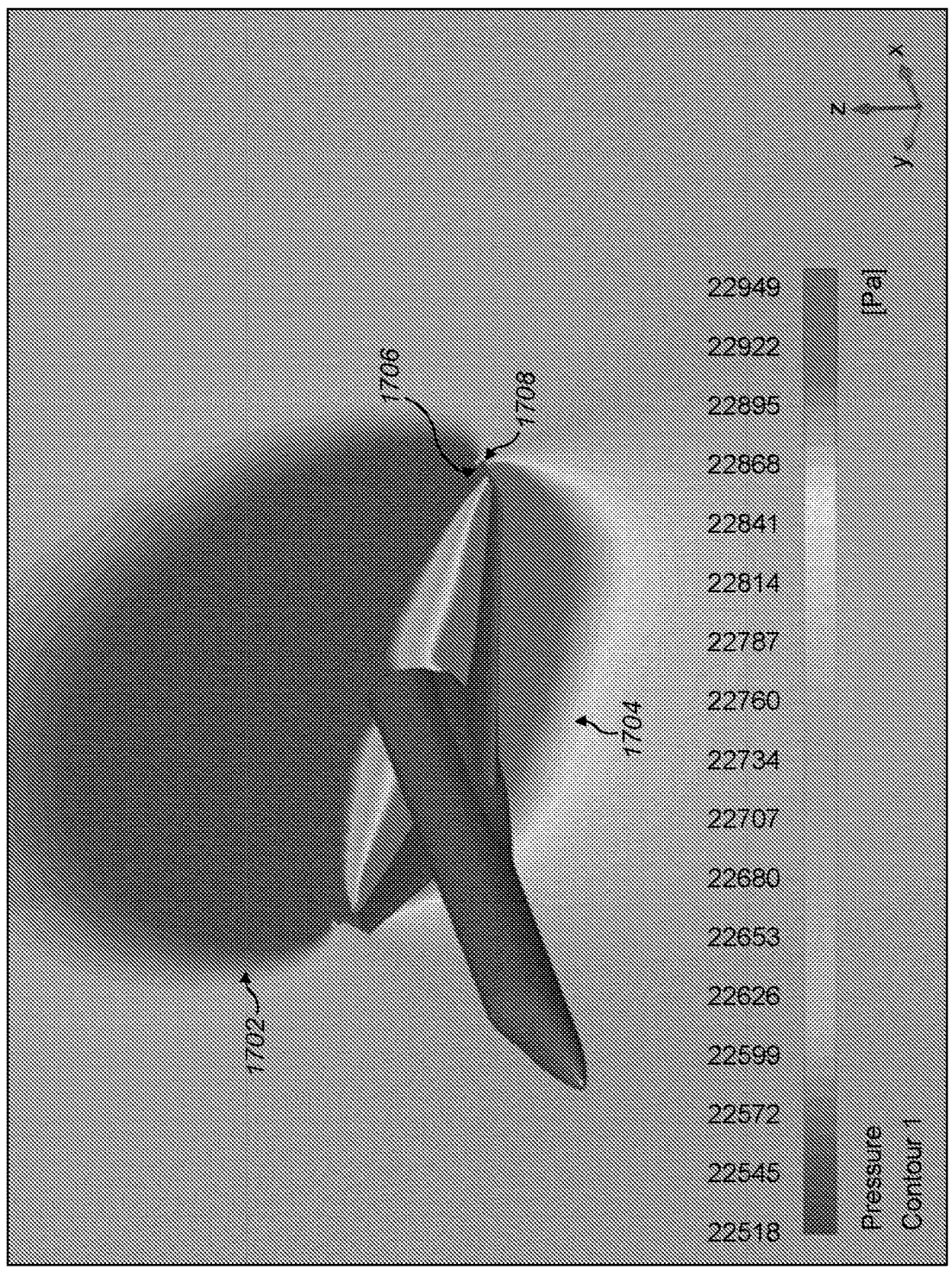
FIG. 17 shows the pressure field around an aircraft equipped with a device for influencing the wake flow obtained from CFD analysis on an ERJ145 jet airliner cruising at 36,000 feet at Mach 0.686.

The effects of the device 400 on the pressure field of an aircraft are illustrated in FIG. 16, which is a schematic illustration of a CFD image obtained by the inventor (which is shown in FIG. 17). The high pressure region beneath the wing is illustrated generally at 1602, and the low pressure region above the wing is illustrated generally at 1604. It can be seen that the low pressure region includes an area 1606 located above the wing at its outboard end in the vicinity of the wing tip. This area corresponds to the low pressure region generated from the cambered outer surface 412 and is located inboard of the duct outlet. The low pressure region further includes a region 1608 located beneath the lower surface of the wing at its outboard end in the vicinity of the wingtip. This low pressure region extends outboard of the duct inlet 418 and corresponds to the region of low pressure generated by cambered outer surface 414. Low pressure regions 1606 and 1608 operate to pressure balance the opposing rotating flow that exits the outlet 420 as described above.

FIG. 17 shows the pressure field around an aircraft obtained from CFD analysis. The low pressure region above the wings of the aircraft is indicated generally at 1702, and the high pressure region below the aircraft is indicated generally at 1704. The localised region of low pressure on the outboard side of the wingtip on the high pressure side is shown at 1708. This corresponds to the region of localised region of low pressure generated from the outer surface 414. The localised region of low pressure on the inboard side of the body on the low pressure side is shown at 1706. This region corresponds to the region of low pressure generated from outer surface 412. Localised pressure regions 1704 and 1706 pressure balance the opposing rotating flows egressed from the duct outlet.

Examples of the wake-controlling device described above may therefore reduce the induced drag of an aircraft wing by reducing the effect of both wing tip and trailing vortices. Reducing the induced drag may enable the wings to generate a required level of lift at a decreased angle of attack compared to a normal wing and with reduced thrust provided from the engines. Thus the device may enable aircrafts to reduce fuel consumption. In particular, it is estimated from CFD analysis that a wake-influencing device as described above could lead to an improvement of circa 15% in an aircraft's lift to drag ratio (L/D) during cruise, which corresponds to an approximate 10% fuel saving. During ascent, it is estimated the device could provide a circa 20% improvement in the L/D ratio, corresponding to a circa 15% fuel saving. During descent, it is estimated the device could provide a circa 10% improvement in an aircraft's lift to drag ratio (L/D), corresponding to an approximate 5% fuel saving. It is therefore believed that a device as described herein has the potential to lead to substantial cost savings for aircraft. In addition, the device reduces the potentially damaging effects of wingtip vortices generated by normal aircraft wings by causing the vortices to be cancelled in the near downstream of the wing. Furthermore, the device may enable the wingtip vortices to be substantially cancelled aft of the wing without generating any additional tension and/or torsion in the wing. This is because the device manipulates fluid flowing therethrough to cancel the wingtip vortices via a fluid-fluid interaction, as opposed to a fluid-structure interaction. Thus the device may be fitted to an existing wing without requiring that the wing undergo spar strengthening (as is often required when fitting winglets), meaning existing wings may be modified with reduced operational down time, potentially leading to further cost savings.

An illustration of how the wake-controlling device described herein may be used without significantly increasing the load on an aircraft wing will now be described. This calculation uses the following aircraft data:

| | Description | Value |
|---|---|---|
| 1 | Mass of aircraft | 22000 kg |
| 2 | Single wing area (Ref area) | 21.9 m$^2$ |
| 3 | Wing semi-span | 10.42 m |
| 4 | Chord length at wingtip | 1.09 m |
| 5 | Load factor limits | +2.5 g/−1.0 g |

Considering first the bending moment of an unmodified wing, an elliptical span-wise lift distribution is assumed to account for wingtip inefficiencies arising from the creation of vortices. This gives a lift distribution of:

$$q_l(x) = ka\sqrt{L^2 - x^2}, \qquad (1)$$

where ka is the lift profile coefficient, L is the length of the wing and x a position along the wing. Integrating equation (1) with respect to x gives the following equation for the lift of the wing:

$$\text{Lift} = \frac{\pi L^2 ka}{4} \qquad (2)$$

The load factor n=Lift/W can be used to relate the lift coefficient to the weight W of the aircraft, resulting in a final expression for the span-wise lift distribution:

$$q_l(x) = \frac{2Wn}{L^2\pi}\sqrt{L^2 - x^2} \qquad (3)$$

The lift moment can be calculated from the expression:

$$M = \int x\, dF \qquad (4)$$

where dF is an elemental contribution of vertical lift at position x. Using equation (3), equation (4) can be evaluated to give:

$$M = \frac{2Wn}{L^2\pi}\int_0^L x\sqrt{L^2 - x^2}\, dx, \qquad (5)$$
$$= \frac{2Wn}{3\pi}L,$$

For the above aircraft data this results in an estimated lifting moment of $4.77\times10^5$ Nm for the unmodified wing.

For an aircraft wing having installed a wake-control device as described herein, it is believed the wing can effectively be modelled as a section of an infinite trapezoidal wing. The lift distribution may therefore be assumed to be proportional to the chord length at each point along the wing, and it is believed that no wingtip effects need be accounted for. It is assumed that the weight of the aircraft was equally distributed over all wing area, so that the pressure on the wings was $P=4.88\times10^3$ Nm$^{-2}$.

For the above aircraft data, the equations for the chord length l as a function of distance along the wing are given by:

$$l = \begin{cases} 3.11 - 0.194x & 0 \le x \le 10.42 \\ 13.91 - 1.23x & 10.42 < x < 11.06 \end{cases}, \qquad (6)$$

Equation (6) accounts for the different shape of the wing and wingtip base. Using equation (6) with the equation for the lifting moment given by equation (4) leads to the following result:

$$M = \int x\, dF = P\int_0^{10.42} x(3.11 - 0.194x)\, dx + P\int_{10.42}^{11.06} x(13.91 - 1.23x)\, dx, \qquad (7)$$

Evaluating equation (7) gives an estimated bending moment for the modified wing of $4.91\times10^5$ Nm. The loss of pressure due to fluid escaping through the duct was considered, but found to only incur a negligible <80 Nm moment in the opposite direction to the bending moment due to lift. This was found from Computational Fluid Dynamic (CFD) simulations of the wingtip.

The above calculations show it may be possible to equip a wake-controlling device of a type described herein to an existing aircraft wing without significantly increasing the bending moment on the wing during flight of the aircraft (and thus the device may be fitted to existing aircraft without requiring the wing to undergo extensive structural strengthening).

The above examples describe a device for modifying the wake of an aerofoil in the form of an aircraft wing. It will be appreciated that this is for the purposes of illustration only and that the principles of the device as described herein may applied to any aerofoil. That is, a device for modifying the wake of an aerofoil as described herein may be applied to any suitable aerofoil such as, for example, helicopter rotor blades, wind turbines, fans, a marine underwater turbine blade, a propeller blade or a hydrofoil.

Further, it will be appreciated that the specific dimensions of the wake-influencing device and its duct illustrated in FIGS. 4 to 15 are only an example and other devices may be created which adopt the principles described herein whilst having different specific dimensions. Without prejudice to accepted theory, it is believed that there is a relationship between the wing area of an aircraft and the cross-sectional area of the duct that relies on the inverse of the Sears-Haack body formula that enables the size and dimensions of the duct to be scaled for use with different aircraft. In particular, it is believed the cross-sectional area of the duct as a function of longitudinal position within the duct, $S(\theta)$, is given by:

$$S(\theta) = kA[\sin(\alpha+\theta) - \tfrac{1}{3}\sin(3(\alpha+\theta))] \qquad (8)$$

where k is a constant, A is the area of the wing and $\theta$ is a dimensionless function of distance defined by $$\theta = \pi\frac{x-a}{l},$$

where l is the length of the Sears-Haack body, x is the distance along the Sears-Haack body and a is the point along the Sears-Hack body at which the inlet edge of the duct starts. The value $\alpha$ is a dimensionless value that represents the position along the Sears-Haack body at which the duct starts.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A device for influencing a wake flow of an aircraft wing, the aircraft wing having an inboard root end and an outboard tip end, a high pressure side and a low pressure side, and a leading edge and a trailing edge, the device comprising a body adapted for attachment in the region of the tip of the aircraft wing and having a through-duct with a first opening at a first end of the duct being located on the high pressure side of the wing and a second opening at a second end of the duct being located on the low pressure side of the wing, the duct being configured to, when the wing is exposed to fluid flow, permit a fluid flow through the duct so as to inhibit the flow of fluid around an outboard extremity of the wing and to direct the fluid flow through the duct into a pair of opposing rotating flows of substantially equal magnitude externally of the duct.

2. The device as claimed in claim 1, wherein the first opening of the duct is formed in part from: (i) an intake surface contoured to entrain oncoming fluid into the duct along an inboard region having a first pressure and to induce within a part of the fluid flow through the duct along the inboard region a first rotational component; and (ii) outboard edge comprising a formation configured to reduce an inlet velocity of fluid in an outboard region of the duct to thereby generate a region having a second pressure whose boundary is convex that induces within a part of the fluid flow through the duct a second rotational component opposite in direction to the first rotational component; the duct being configured to direct the parts of the fluid flow with the first and second rotational components out of the second opening into the pair of opposing rotating flows, the second pressure being higher than the first pressure.

3. The device as claimed in claim 1, wherein the duct has a plenum located between the first and second openings, and a first restriction located between the plenum and the first opening.

4. The device as claimed in claim 3, wherein an outboard wall of the duct defines a fluid-arresting structure configured to, when the device is exposed to fluid flow, generate a region having a second pressure within the duct that contributes to directing the airflow through the duct into a pair of opposing rotating flows of substantially equal magnitude externally of the duct, wherein the fluid-arresting structure defines an outboard edge of the first opening, and wherein the second pressure is higher than a first pressure at an inboard region.

5. The device as claimed in claim 4, wherein the fluid-arresting structure is in the shape of an aerofoil nose section.

6. The device as claimed in claim 4, wherein the fluid-arresting structure is configured to, when the device or aerofoil is exposed to fluid flow, reduce the velocity of fluid entering the duct within an outboard region of the duct to thereby generate the relative high pressure region.

7. The device as claimed in claim 6, wherein the fluid-arresting structure comprises a trip strip in the vicinity of the first opening.

8. The device as claimed in claim 4, wherein the region of relative high pressure causes the airflow through the duct to have a pressure and velocity imbalance between inboard and outboard sides of the duct within the first restriction and the plenum.

9. The device as claimed in claim 4, wherein the duct is configured to have a cross-sectional area profile that causes the region of relative high pressure to adopt an aerofoil shape oriented generally along the longitudinal direction of the duct.

10. The device as claimed in claim 9, wherein the region of relative high pressure of aerofoil shape causes part of the airflow through the duct to adopt streamlines that follow said aerofoil shape thereby causing said part of the airflow to adopt a first rotational component.

11. The device as claimed in claim 10, wherein the body comprises an intake surface that extends into an inboard wall of the duct, the intake surface being configured to, when the device or aerofoil is exposed to fluid flow, entrain fluid into the duct via the first opening, the intake surface extending generally in an upwards and outboard direction to encourage a part of the fluid flow through the duct to remain attached to the inboard wall.

12. The device as claimed in claim 11, wherein the intake surface is contoured so as to cause a part of the fluid flow through the duct along its inboard region to adopt a second rotational component opposite in direction to the first rotational component.

13. The device as claimed in claim 12, wherein the duct has a second restriction located between the plenum and the second opening, the second restriction being configured to cause the part of the airflow with the first rotational component to adopt a substantially equal mass flow rate as the part of the airflow with the second rotational component and to direct said parts of the airflow out of the duct via the second opening into the pair of opposing rotating flows.

14. The device as claimed in claim 3, wherein the duct has a second restriction located between the plenum and the second opening.

15. The device as claimed in claim 1, wherein the first opening is swept relative to a chord line of the body by substantially 5 degrees.

16. The device as claimed in claim 1, wherein the body has a first outer surface that encompasses the first opening and a second outer surface that encompasses the second opening, the first and second outer surfaces being cambered so as to, when exposed to fluid flow, generate a first localised region of low pressure outboard of the first opening on the high pressure side, and a second region of low pressure inboard of the second opening on the low pressure side, whereby the first and second low pressure regions pressure balance the pair of opposing rotating flows.

17. The device as claimed in claim 1, wherein the body has a leading edge and at least one chord line, the leading edge defining a sweep angle relative to the at least one chord line, wherein the sweep angle between the chord line and leading edge is substantially 24 degrees.

18. The device as claimed in claim 1, wherein the centroid of the second opening is positioned outboard and aft relative to the centroid of the first opening.

19. A method for controlling a wake turbulence of an aircraft wing having with a formation at its tip defining a duct extending through the wing from its underside to its upper side, the duct having an inlet on the underside of the wing and an outlet on the upper side of the wing, a plenum between the inlet and the outlet and a restriction between the inlet and the plenum, the duct being configured so that, when the wing is exposed to a free-stream flow, a flow is developed through the duct, the restriction contributes to the formation of a pressure region on the outboard side of the duct in the region of the plenum and a majority of the flow leaving the duct by the outlet is constituted as two counter-rotating vortices, the method comprising subjecting the wing to the free-stream flow so as to cause the said vortices to be generated.

20. An aerofoil comprising a structure for influencing a wake flow of the aerofoil when the aerofoil is subject to fluid flow, the aerofoil having an inboard root end and an outboard tip end, a high pressure side and a low pressure side and a leading edge and a trailing edge, the structure comprising a body located in the vicinity of the tip of the aerofoil, the body having a through-duct with a first opening at a first end of the duct being located on the high pressure side of the aerofoil and a second opening of the duct being located on the low pressure side of the aerofoil, the duct being configured to, when the aerofoil is exposed to fluid flow, permit a fluid flow through the duct to inhibit the flow of fluid around the outboard extremity of the aerofoil and to direct the fluid flow through the duct into a pair of opposing rotating flows of substantially equal magnitude externally of the duct.

* * * * *